US012458882B2

(12) United States Patent
Herigstad et al.

(10) Patent No.: US 12,458,882 B2
(45) Date of Patent: Nov. 4, 2025

(54) SYSTEM AND METHOD FOR GENERATING AND PLAYING A VOLUMETRIC SCRABBLE GAME

(71) Applicant: Isovist Limited, London (GB)

(72) Inventors: Dale A. Herigstad, London (GB); Jack Turpin, Los Angeles, CA (US); Eric Fanghanel Santibanez, London (GB)

(73) Assignee: ISOVIST LIMITED, London (GB)

( * ) Notice: Subject to any disclaimer, the term of this patent is extended or adjusted under 35 U.S.C. 154(b) by 288 days.

(21) Appl. No.: 18/319,940

(22) Filed: May 18, 2023

(65) Prior Publication Data

US 2024/0382847 A1 Nov. 21, 2024

(51) Int. Cl.
*A63F 13/52* (2014.01)
*A63F 13/537* (2014.01)
*A63F 13/822* (2014.01)

(52) U.S. Cl.
CPC ............ *A63F 13/52* (2014.09); *A63F 13/537* (2014.09); *A63F 13/822* (2014.09)

(58) Field of Classification Search
CPC .... A63F 13/52; A63F 13/5375; A63F 13/537; A63F 13/822
See application file for complete search history.

(56) References Cited

U.S. PATENT DOCUMENTS 5,769,716 A * 6/1998 Saffari ................ G07F 17/3265 463/20
6,062,978 A 5/2000 Martino et al.
2002/0111204 A1 8/2002 Lupo
2003/0199293 A1 10/2003 Skripachev et al.
2004/0023714 A1 * 2/2004 Asdale .................... G07F 17/32 463/22
2005/0107154 A1 * 5/2005 Pacey ................. G07F 17/3267 463/20

(Continued)

OTHER PUBLICATIONS

Heiko Tietze, "Scrabble3D", Feb. 28, 2015, Youtube.com, pp. 1-10, at https://www.youtube.com/watch?v=XwoBwl3PZvM (last visited Apr. 28, 2025). (Year: 2015).*

(Continued)

*Primary Examiner* — Steve Rowland
(74) *Attorney, Agent, or Firm* — ARENTFOX SCHIFF LLP

(57) ABSTRACT

A method for generating an interactive three dimensional (3D) game includes generating a manipulable volumetric virtual 3D display cube. The display cube includes a plurality of cubic elements. Different combinations of the plurality of cubic elements include a plurality of play objects. A first, second, third, fourth and fifth input object is generated. A determination is made whether the user provided the input by manipulating at least one of the display cube, first, second, third or fourth input object. The display cube is rotated along at least a vertical axis, in response to determining that the user provided the input by manipulating the display cube. A different play object/different axis is displayed within the display cube as the selected play object/play axis based on user's manipulation of the first/second input object, in response to determining that the user provided the input by manipulating the first/second input object.

16 Claims, 39 Drawing Sheets

(56) References Cited

U.S. PATENT DOCUMENTS

| | | | | |
|---|---|---|---|---|
| 2009/0118004 | A1* | 5/2009 | Hoffman | G07F 17/3248 463/31 |
| 2009/0137309 | A1* | 5/2009 | Thomas | G07F 17/3211 463/20 |
| 2010/0004050 | A1* | 1/2010 | Caputo | G07F 17/3265 463/20 |
| 2011/0034246 | A1 | 2/2011 | Amitzur | |
| 2011/0045906 | A1* | 2/2011 | Berman | G07F 17/3202 463/43 |
| 2011/0053675 | A1* | 3/2011 | Aoki | G07F 17/3211 463/20 |
| 2011/0086695 | A1* | 4/2011 | Evans | G07F 17/32 463/43 |
| 2022/0266126 | A1* | 8/2022 | Thelen | A63F 9/0612 |
| 2025/0078605 | A1* | 3/2025 | Smithers | G07F 17/34 |

OTHER PUBLICATIONS

Office Action in GB2316819.8, mailed Dec. 21, 2023, 6 pages.

Combined Search and Examination Report received for United Kingdom Application No. 2406492.5, mailed on Nov. 1, 2024, 7 pages.

* cited by examiner

SYSTEM AND METHOD FOR GENERATING AND PLAYING A VOLUMETRIC SCRABBLE GAME

FIELD

The present disclosure relates generally to electronic games, and more specifically to a system and method for generating and playing a three dimensional (3D) Scrabble® game.

BACKGROUND

Scrabble® is one of the most popular board games in the world. Scrabble® is played by two to four players on a board containing a grid of rectangles. Each player picks 7 input tiles and places them on a rack in front of them. The tiles also show point values associated with the letter on each tile, with larger values being allocated for letters used less frequently; for example, an "E" is worth 1 point whereas a "Z" is worth 10. The game begins with first player placing a word in the center of the board (one letter of the first word must be played on the center square). The players take turns forming legitimate words of a given language (e.g., English, Spanish, French, etc.) on the board by placing the tiles in the rectangles. Scores are influenced by special rectangles on the board which award extra points for doubling or tripling the value of a particular letter or an entire word.

After forming a word, that player announces his score and it is recorded. The player then replenishes their rack with new tiles, only having 7 tiles in their rack at any time. If all 7 tiles are used in one word, the player receives a bonus of 50 points and takes 7 more tiles, if there are that many left in the bag or face down on the table. Play then proceeds to the next player. Taking turns, everyone places their tiles on the board to form legitimate words. If other players feel a word is not legitimate, they can challenge it. If the challenge is proven to be correct, the player has to take the word off the board, losing the point total and a turn. In modern digital versions of the game, input words are automatically checked against a game dictionary, and an "input is not a word" message is generated for display when an input word is not present in the game dictionary. Players have to add onto other player's tiles to form new words. The goal of the game is to use all the tiles on the board. The game ends when one of the players has used up all their tiles and the tiles in the bag or if no more legitimate words can be formed by the remaining tiles. The point scores left on the other players racks are subtracted from their scores and added to the first place finisher's score. The person with the highest score wins.

Computer video games have become popular entertainment options for children and adults alike. Many fantasy games have been created and many traditional games such as chess, draw poker and the like have been implemented in a computer video format. However, such video games typically keep the same format as the original game and, although some are often displayed in three dimensions, they are generally limited to two-dimensional play on the video screen. In other words, traditional video games generally do not permit the game to be manipulated and played in three dimensions volumetrically and thus do not permit the additional level of complexity possible when the games are played in three dimensions volumetrically. The term "volumetrically" indicates that the game is played on a cubic structure (e.g., 15 letter cubes by 15 letter cubes by 15 letter cubes in which there are 3375 potential letter cubes for use in word plays. Each letter in the cube has a unique position (e.g., (X,Y,Z) in an XYZ-plane.

Virtual and augmented reality environments are generated by computers using, in part, data that describes the environment. This data may describe, for example, various objects with which a user may sense and interact with. Examples of these objects include objects that are rendered and displayed for a user to see, audio that is played for a user to hear, and tactile (or haptic) feedback for a user to feel. Users may sense and interact with the virtual and augmented reality environments through a variety of visual, auditory and tactical means.

Thus, improvements in efficient implementation of traditional board games to be played and manipulated in virtual and augmented reality environments are needed.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The present disclosure implements traditional games in a volumetric cube displayed on a computer display screen in three dimensions. In an aspect, the volumetric display cube permits the game to be played and manipulated in three dimensions by allowing a player to manipulate the volumetric display cube to expose the respective faces during play of the game. Advantageously, the volumetric display cube is configured to be rendered and manipulated in virtual and augmented reality environments.

In an aspect, a method for generating an interactive three dimensional (3D) game includes generating a manipulable volumetric virtual 3D display cube. The manipulable volumetric virtual 3D display cube includes a plurality of cubic elements. Different combinations of the plurality of cubic elements include a plurality of play objects. A first input object, second input object, third input object fourth input object, and fifth input object is generated. A determination is made whether the user provided the input by manipulating at least one of the manipulable volumetric virtual 3D display cube, first input object, second input object, third input object or fourth input object The manipulable volumetric virtual 3D display cube is rotated along at least a vertical axis, in response to determining that the user provided the input by manipulating the manipulable volumetric virtual 3D display cube. A different play object is displayed within the manipulable volumetric virtual 3D display cube as the selected play object based on user's manipulation of the first input object, in response to determining that the user provided the input by manipulating the first input object. A different axis is selected as the play axis for the selected play object within the fifth input object based on user's manipulation of the second input object, in response to determining that the user provided the input by manipulating the second input object.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components may be shown in block diagram form in order to avoid obscuring such concepts.

Those skilled in the art will readily appreciate that the description given herein with respect to those figures is for explanatory purposes only and is not intended in any way to limit the scope of the disclosure. For example, while the preferred aspect of the disclosure is described with respect to a Scrabble® game, those skilled in the art will appreciate that numerous other applications, games, and the like may be implemented in three dimensions on a computer video screen in accordance with the techniques of the disclosure. Accordingly, all questions regarding the scope of the disclosure should be resolved by referring to the claims.

Turning now to the figures, example aspects are depicted with reference to one or more components described herein, where components in dashed lines may be optional.

Figure 1:
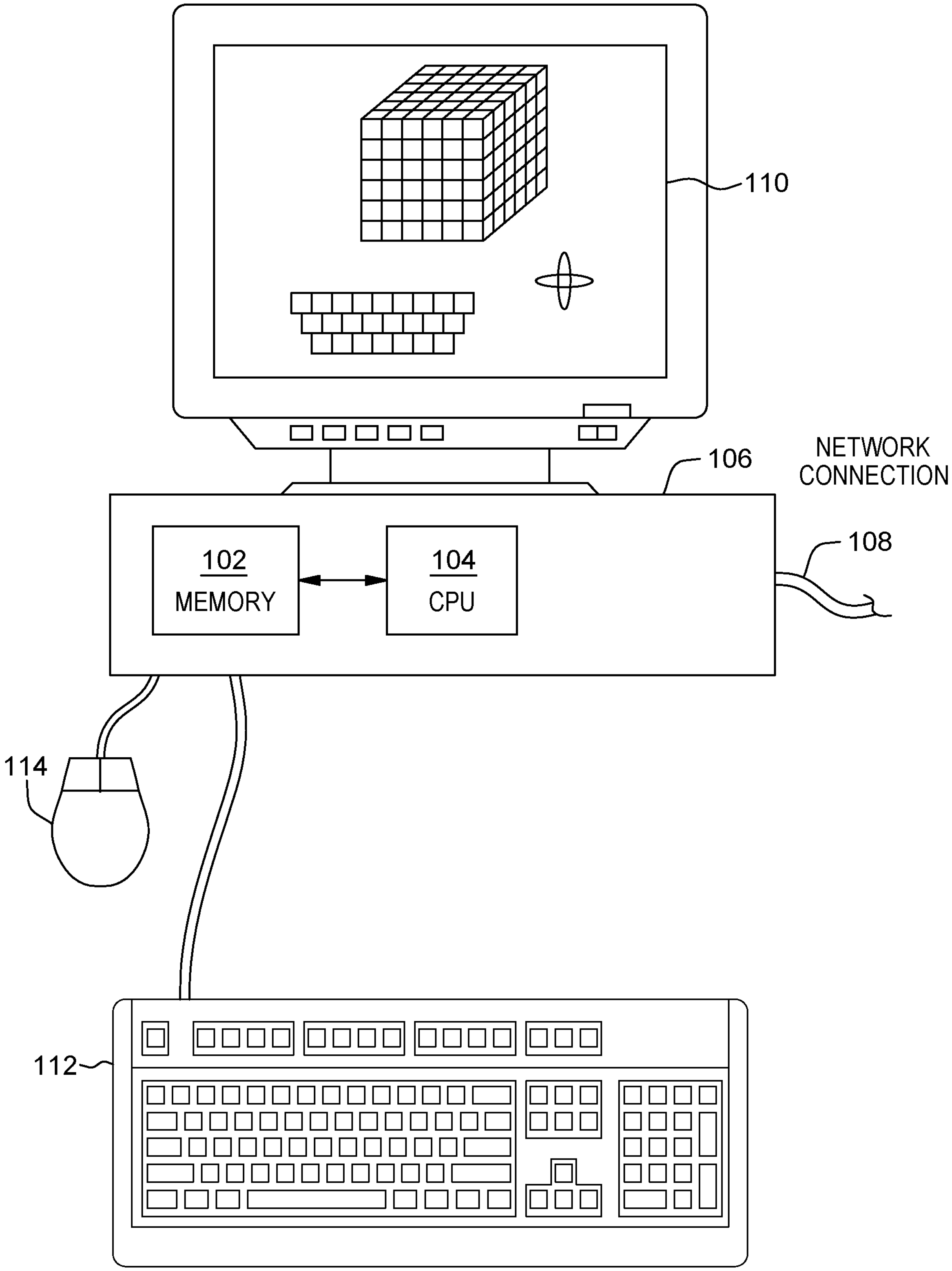
FIG. 1 illustrates a host computing device which may be connected to a computer network to receive data including game software in accordance with some present aspects.

Various aspects presented herein are preferably implemented as software containing instructions for controlling a processor, which in turn controls the display on a computing device. FIG. 1 illustrates such a computing device. It is noted that for ease of understanding the principles disclosed herein are in an example context of a stationary computing device 106, such as, but not limited to, a gaming computer with hardware supporting gaming functionality. However, the principles disclosed herein may be applied to other devices, such as, but not limited to, mobile computing devices, personal digital assistants (PDAs), media players and other similar devices capable of rendering virtual and augmented reality environments. In an aspect, software implementing the disclosure may be stored on a program storage device 102 readable by a processor 104 of computing device 106 whereby the program of instructions stored thereon is executable by the processor 104 to perform the method steps illustrated in FIGS. 11A and 11B, for example. The game software may be provided in digital form on a computer readable medium, or may otherwise be transmitted to the host computing device 106 in digital form over a network connection 108 and loaded into the computing device's memory 102.

During play of the game, the game software may be loaded on the memory 102 of the host computing device 106 in the game mode, the game's graphics images are displayed on a video display 110, and play of the game is controlled by user entries via touchscreen (as described below) and/or via keyboard 112 and mouse 114. Some computing devices 106 such as laptop computers, may include a trackpad or touchpad (not shown in FIG. 1) that can be used in place of or in addition to the mouse 114 to maneuver a cursor on a computer screen, or to trigger one or more functions of the computing device 106. Such trackpads or touchpads can be coupled to, or integrated within, the computing device 106. A touchpad (also referred to herein interchangeably as a trackpad) is a navigating device featuring a tactile sensor, which is a specialized surface that can translate the motion and position of a user's fingers to a relative position on screen and/or within a virtual/augmented reality environment. Touchpads are a feature of laptop computers or mobile devices, and are also used as a substitute for a mouse, for example where desk space is scarce. Because they vary in size, they may also be found on personal digital assistants and portable media players. Wired or wireless touchpads are also available as accessories. By integrating multi-touch input capability into the touchpad and/or touchscreen without altering its overall appearance or, more importantly, the familiar way in which it is used for interacting with a computing device, many of the benefits of multi-touch gesture-based input capability can be realized without having any negative impact on the user's interactive experience. Additionally, same interaction layouts may be shown both on a touchscreen and in virtual and augmented reality environments.

The computing device 106 may operate in a networked environment supporting connections to one or more remote computers, such as client devices. The network connection 108 depicted in FIG. 1 may include a local area network (LAN) and a wide area network (WAN), but may also include other networks. When used in a LAN networking environment, computing device 106 may be connected to the LAN through a network interface or adapter. When used in a WAN networking environment, computing device 106 may include a wide area network interface for establishing communications over the WAN, such as the Internet. It will be appreciated that the network connections shown are illustrative and other means of establishing a communications link between the computers may be used. In an aspect, the computing device 106 may also comprise a mobile terminal, including, but not limited to, a mobile phone, smartphone, tablet computer, personal digital assistant (PDA), notebook, and the like, which may include various other components, such as, but not limited to a battery, speaker, and antennas (not shown).

FIGS. 2A-2F illustrate different views of a display cube with different value cubic element patterns according to some present aspects.

Figure 2A:
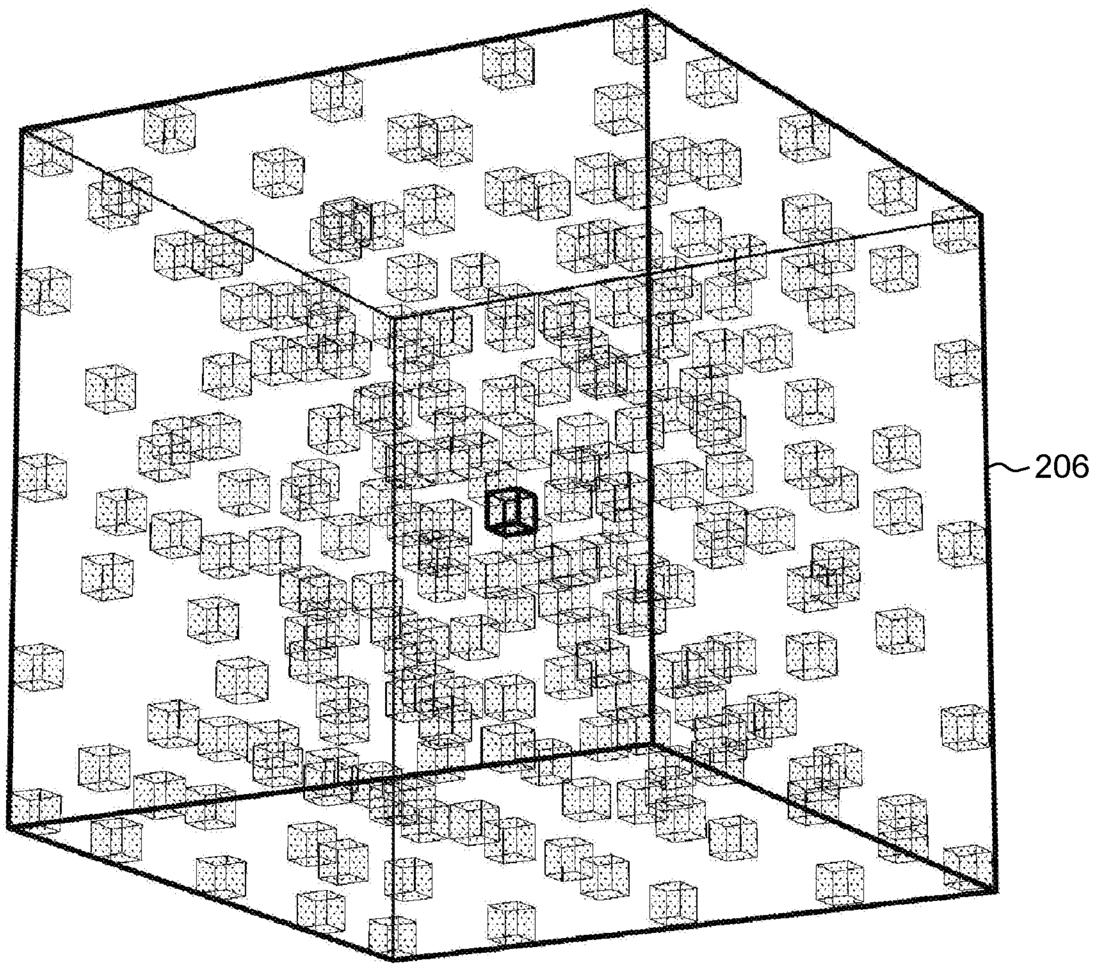
FIGS. 2A-2F illustrate different views of a display cube with different value cubic element patterns according to some present aspects.
Figure 2B:
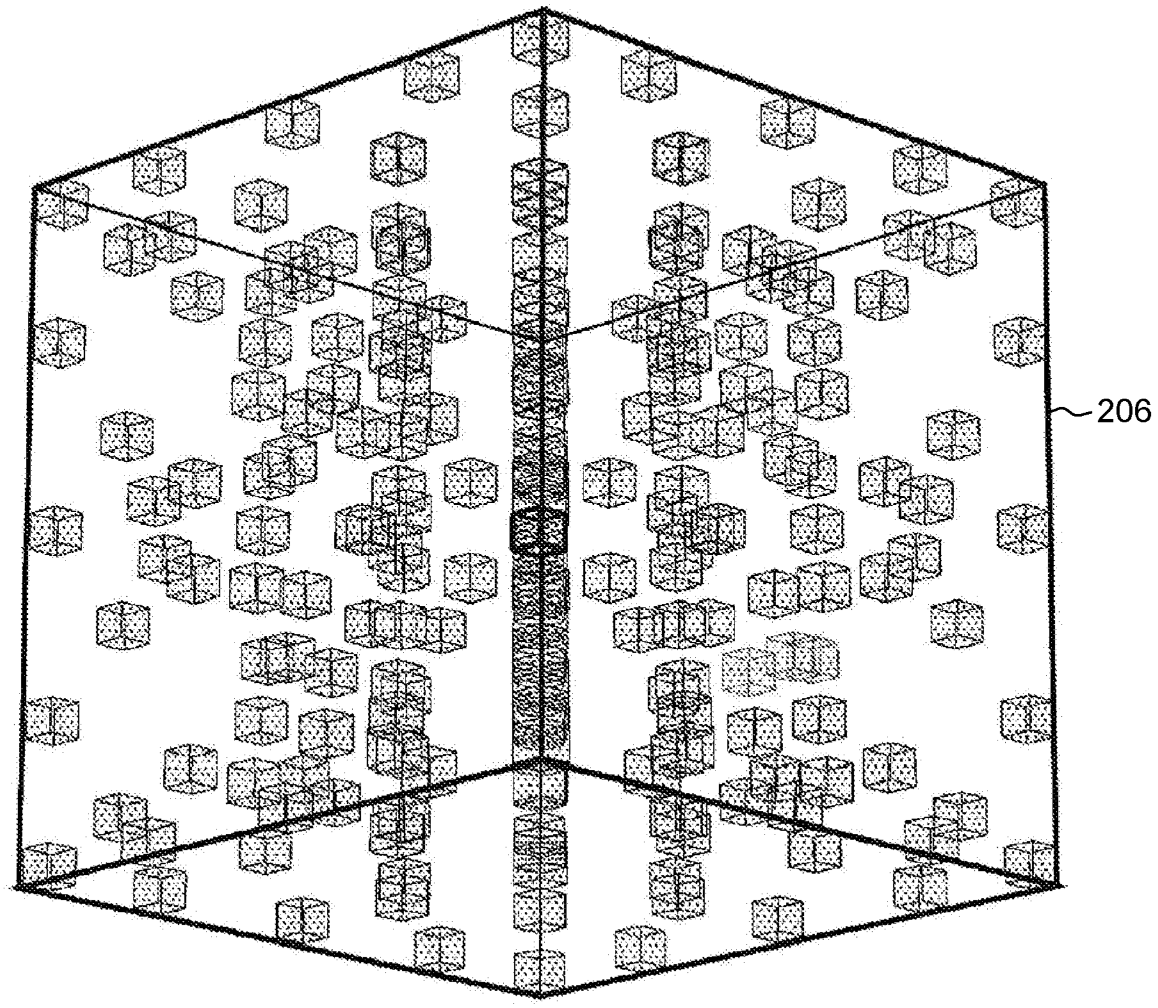

In the illustrative aspects of FIGS. 2A and 2B, the display cube 206 has a plurality of sets of value cubic elements formed or otherwise displayed thereon. A first set of value cubic elements may represent a double letter score, whereby, as described hereinafter, when a word is formed in the display cube 206 with a letter in one of the cubic elements of the first set, the sum of the point values of the letters of that word is doubled for purposes of calculating the final score in the game. Similarly, a second set of value cubic elements may represent a triple letter score, whereby, as described hereinafter, when a word is formed in the display cube 206 with a letter in one of the cubic elements of the second set, the sum of the point values of the letters of that word is tripled for purposes of calculating the final score in the game. As yet another example, a third set of value cubic elements may represent a double word score whereby the sum of the letter values of a word having a letter in one of the double word score cubic elements is doubled. Similarly, a fourth set of value cubic elements may represent a triple word score whereby the sum of the letter values of a word having a letter in one of the triple word score cubic elements is tripled. In an aspect, each of the sets of value cubic elements may be color coded by the processor 104. For example, triple word score cubic elements may be shown in red.

Figure 2C:
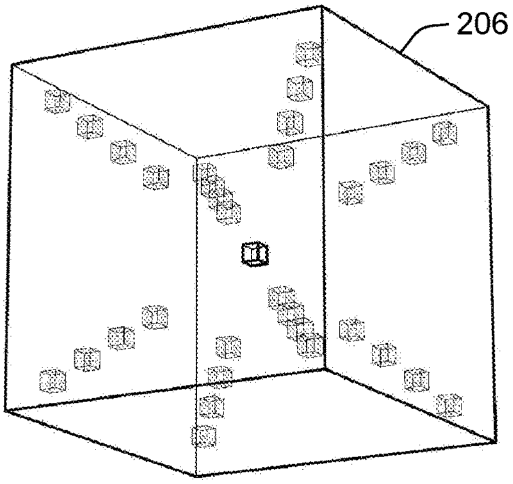
Figure 2D:
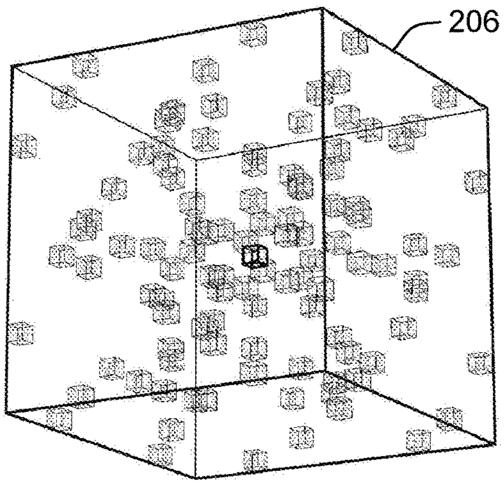
Figure 2E:
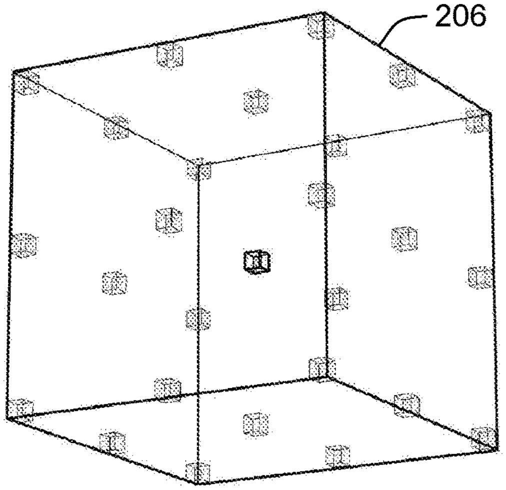
Figure 2F:
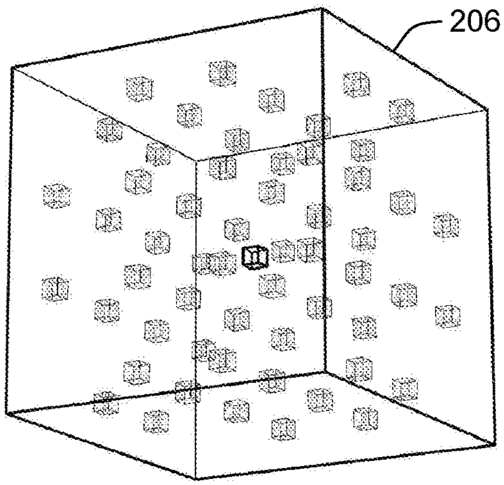

FIG. 2C illustrates a pattern of double word cubic elements. In an aspect, the double word cubic elements may be rendered in pink color. FIG. 2D illustrates a pattern of double letter cubic elements. In an aspect, the double letter cubic elements may be rendered in light blue color. FIG. 2E illustrates a pattern of triple word cubic elements. In an aspect, the triple word cubic elements may be rendered in red color. FIG. 2F illustrates a pattern of triple letters cubic elements. In an aspect, the triple letter cubic elements may be rendered in dark blue color.

In an aspect, the shape of the display cube 206 may be defined by a plurality of corner cubic elements. In an aspect, each of the corner cubic elements may comprise a triple word score cubic elements. It should be noted that additional triple word score cubic elements 215 may reside on the outer planes of the display cube 206.

FIGS. 2A and 2B series illustrate the three dimensional arrangement (pattern) of all value cubic elements for the display cube 206. The value cubic elements are shown as two groups or the four value cube types described above. FIG. 2A illustrates a view that is "straight" aligned to the 45 degree rotation of the display cube 206. FIG. 2B is a rotated (angled) view of the display cube 206. As shown in FIGS. 2A and 2B the arrangement of value cubic elements is very complex. As shown, display cube 206 is volumetric, which suggests that it contains a plurality of cubic elements (e.g., the smaller cubes). Consider an example of display cube 206 having the dimensions, 15 cubic elements (in length) by 15 cubic elements (in width) by 15 cubic elements (in depth). The volumetric attribute of display cube 206 indicates that there are 15×15×15=3375 cubic elements inside display cube 206. Thus, the interior of display cube 206 can feature up to 3375 potential cubic elements that can receive letters to create words. When considered with respect to an XYZ plane, words can be arranged on the X-axis (across), the Y-axis (down) and Z-axis (inward). Such presentation of all value cubic elements at all times during game play would create significant levels of congestion and confusion for users. Advantageously, aspects of the present disclosure contemplate filtered or selective presentation of only those value cubic elements that can be possibly utilized for play of any focus word chosen by a user, as described below.

FIGS. 3A-3F illustrate manipulation of a display cube as displayed on a mobile device screen according to some present aspects. As illustrated, the Scrabble® game may be implemented on a manipulable volumetric virtual 3D display cube 206 rendered on a screen of the computing device 106. In an aspect, the manipulable volumetric virtual 3D display cube (referred to hereinafter as display cube) 206 may include a plurality of cubic elements. In an aspect, the display cube 206 may be dynamically rotated and manipulated by a user, for example, using a mouse 114. If the computing device 106 is a mobile device, the display 302 of the mobile device may be a touchscreen display. Touchscreen displays enable a user to view information on a mobile device's display, while also enabling the user to provide inputs, issue commands, launch applications, manipulate displayed object, etc. using the same display as an input.

FIG. 3A-3F also illustrates a plurality of game input objects. In an aspect, the game input objects may include, but are not limited to, a word list 304, play axis manipulation object 307 (hereinafter referred to as crosshair object 307) shown in FIG. 3B, axis picker input object 308 (shown in FIG. 3B), a word builder 310 and a plurality of input tiles 312. In an aspect, at the start of the game, the processor 104 may assign 7 randomly generated letters to the input tiles 312 for each player participating in the game. In an aspect, the processor 104 may render the display cube 206 to a user at the start of the game and at any time in playing mode in a default wide context view mode shown in FIG. 3A, for example. In the initial view mode, the entire display cube 206 is visible to a user. From this view, the game enters a close-up detailed view mode (e.g., by double tapping on the screen) in which the area in which the user intends to enter letters is more prominently visible.

Figure 3A:
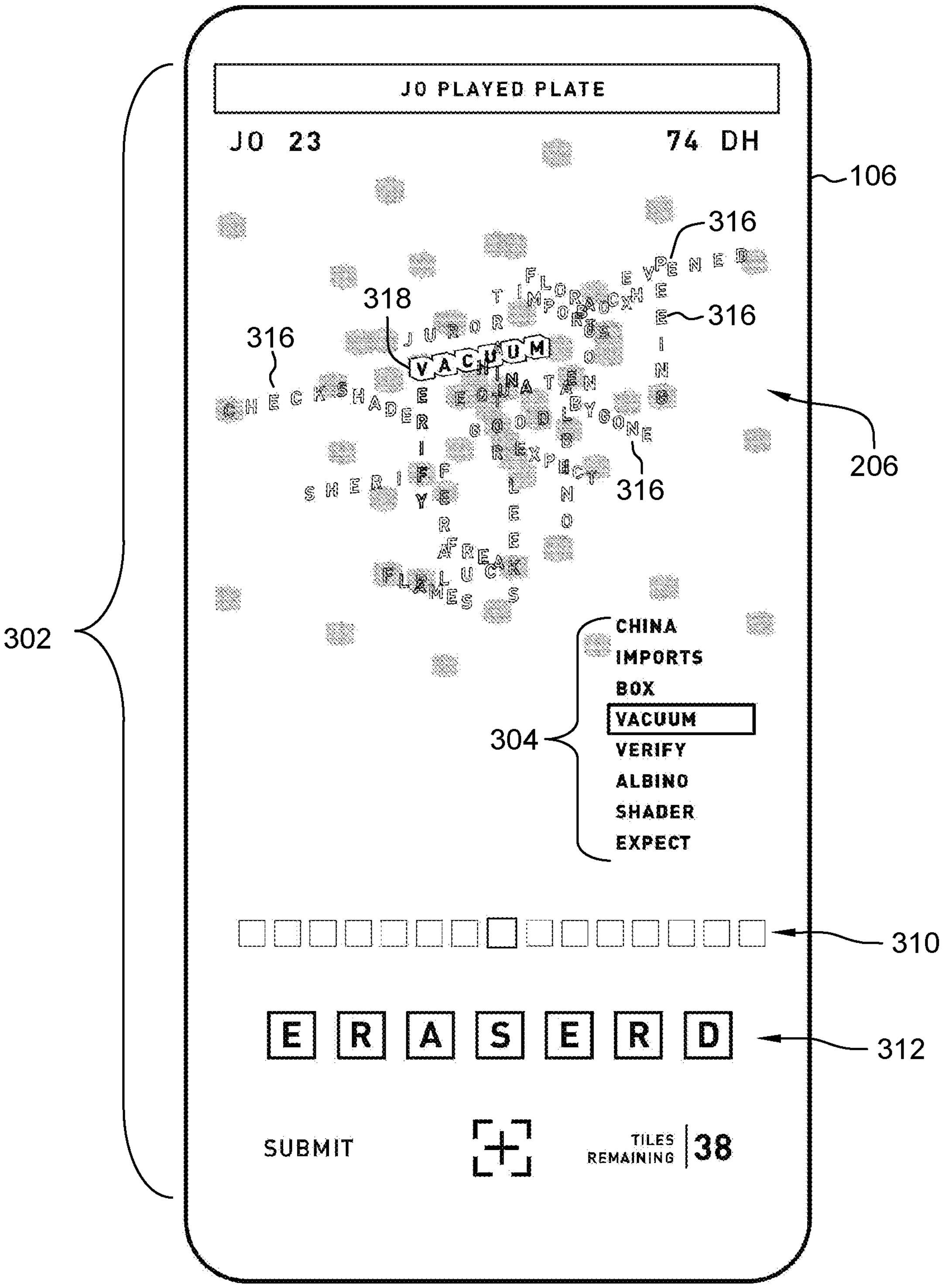
FIGS. 3A-3F illustrate manipulation of a display cube as displayed on a mobile device screen according to some present aspects.

In an aspect, the display cube 206 may render all played play objects 316 (such as other played words). In an aspect, each play object 316 may include a plurality of cubic elements. In an aspect, the processor 104 may generate a geometry buffer for storing the x, y, z values of each cubic element 316. In an aspect, the word builder 310 and the letter selector 312 may be rendered at the bottom of the touch screen 302, as shown in FIG. 3A.

In an aspect, by manipulating another input object, namely the word list 304, a user may select next play position within the display cube 206. In the example in FIG. 3A, a user selected the word "vacuum" in the word list 304.

In response, the processor 104 selects the position 318 of the play object rendering the word "vacuum" within the display cube 206. Such selected play object is referred to hereinafter as a selected word 318. In an aspect, the selected word 318 may be highlighted using an outline around the selected word 318 such that only the outer parts of the group of letters are shown (not showing the inner compounded lines). This unique way of displaying outer outlines around the cubes that make up a selected word is rendered in real-time for all views of the word. As shown in FIG. 3A, a generally rectangular-shaped outline may be rendered by the processor 104 around the selected word 318. According to an aspect, the outline may have varying widths and varying transparency for both indicating an outer perimeter of the selected object 318 and for allowing a user to see through the outline to the background color and properties of the display screen beneath the outline. For example, the outline may have a width of 20 pixels, a transparency value of 30% and yellow coloring.

In another aspect, the visual setup may be more defined. For example, the thickness values (on a scale of 0.1-3) for a selection outline, crosshair outline (e.g., yellow around the word), axis picker outline (e.g., green highlight), verifying word outline (e.g., orange highlight for verified words), may be 2.4, 1.5, 3, and 1.3, respectively. The letter transparency (on a scale between 0 and 1) for a selected word and letters inside a selected axis may be 1, for a second level of connected letters may be 0.6, and for a third level will fade from 0.5-0.23 based on distance.

In an aspect, the play objects 316 other than the selected object 318 may be displayed in transparent white color. Visual appearance of the play objects 316 may be indicative of their relative proximity to the selected object 318. As a non-limiting example, the processor 104 may render play objects 316 that are located closer to the selected object 318 to appear brighter than play objects 316 that are located further away from the selected object 318.

In addition, to putting into a focus the selected word 318, the processor 104 may also indicate all value cubic elements associated with the selected word 318 that may be displayed around the selected word 318. As a non-limiting example, the selected word may include two double letter cubic elements and one triple word cubic element. As noted above, all value cubic elements may be color coded. In an aspect, the view of the display cube 206 illustrated in FIG. 3A may facilitate user's selection of a next playing location within the display cube 206 and availability of value cubic elements (if any) that may correspond to the next playing location. In an aspect, the processor 104 may only selectively display the value cubic elements around the selected word 318 that are useful for any words played off the selected word 318.

In an aspect, the processor 104 may receive or detect an event associated with moving the display cube 206. The event may be a touch, a gesture, a proximity or hovering input using an electronic pen or a part of user's body, etc. For example, while the display cube 206 is displayed on the touch screen 302, the event may be generated by moving the display cube 206 upwards, downwards, rightwards, or leftwards and releasing after touching the screen 302. In an aspect, the processor 104 may rotate the display cube 206 in the direction of finger motion.

In an aspect, the display cube 206 may be rendered in either a "look up at" (display cube) or a "look down at" positions. In an aspect, a user may perform a touch and tilt down operation to look downward at the display cube 206. Similarly, a user may perform a touch and tilt up operation to look upward at the display cube 206, when the display cube 206 is rendered in "look down at" position. In an aspect, a user may perform a double tap operation by double tapping central portion of the display cube 206 and a mapping function (e.g., zoom in/out to/from the selected word 318) corresponding to the selected surface may be performed dynamically by the processor 104 responsive to user's input (double tap).

Figure 3B:
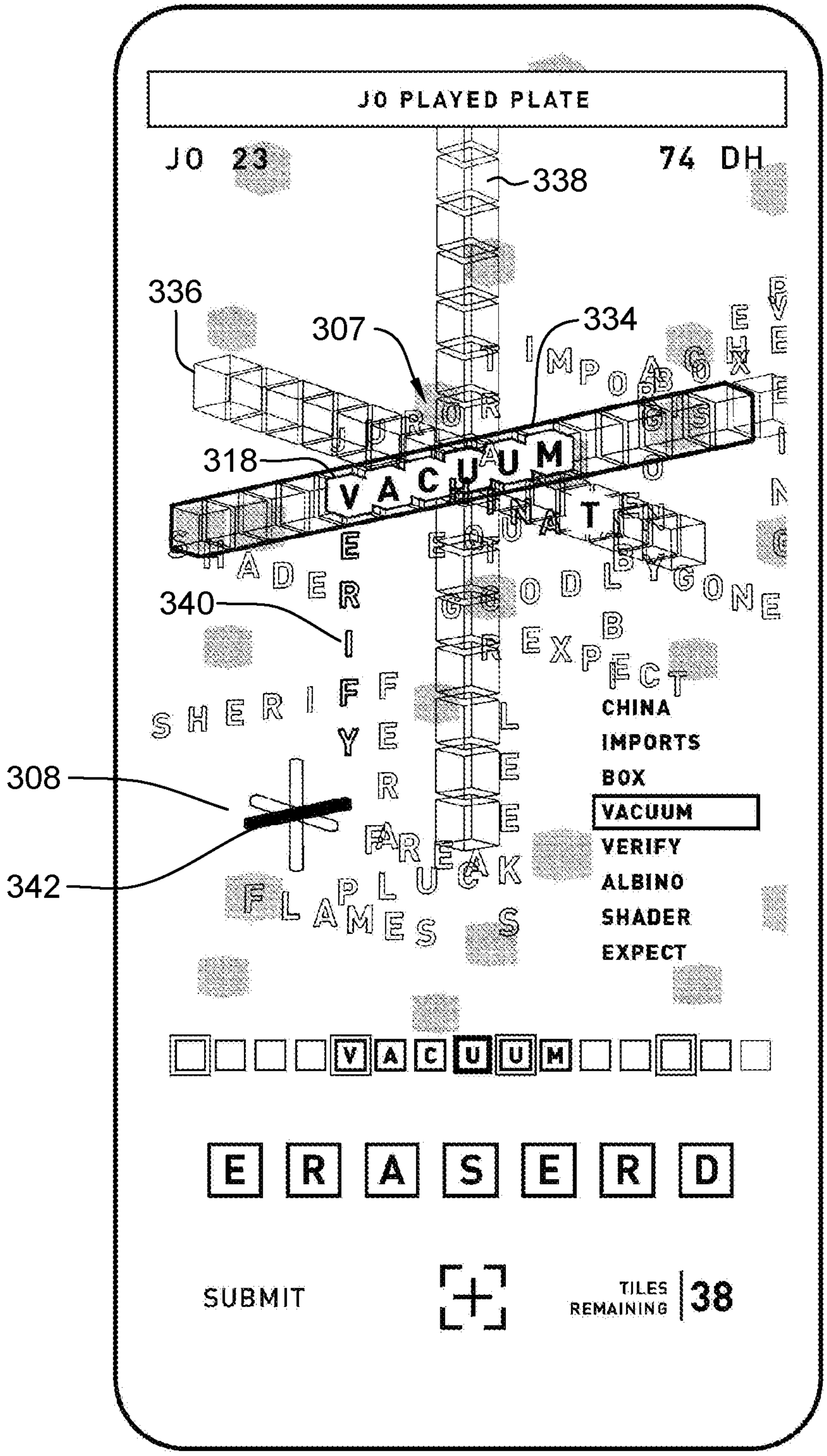
Figure 3C:
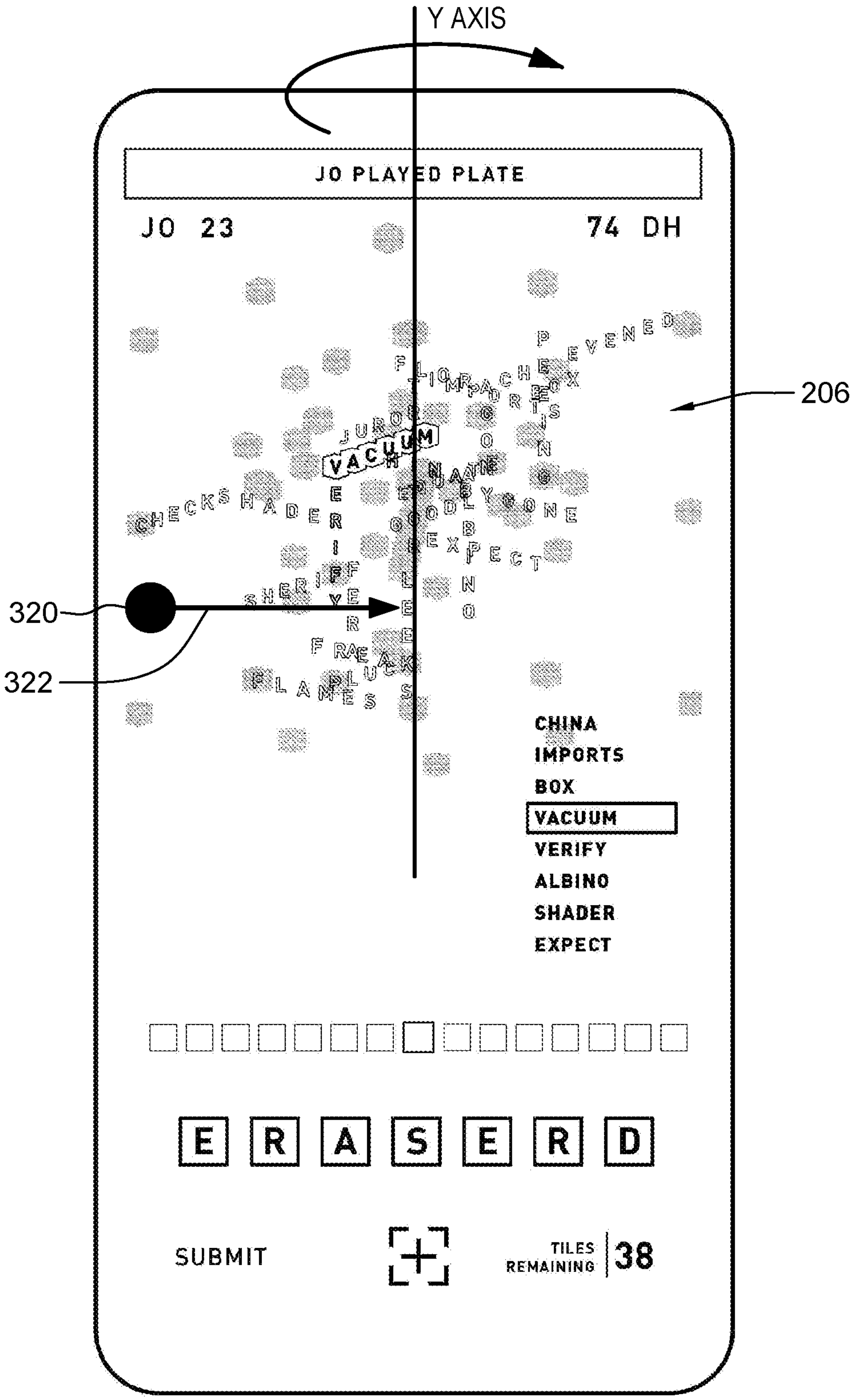
Figure 3D:
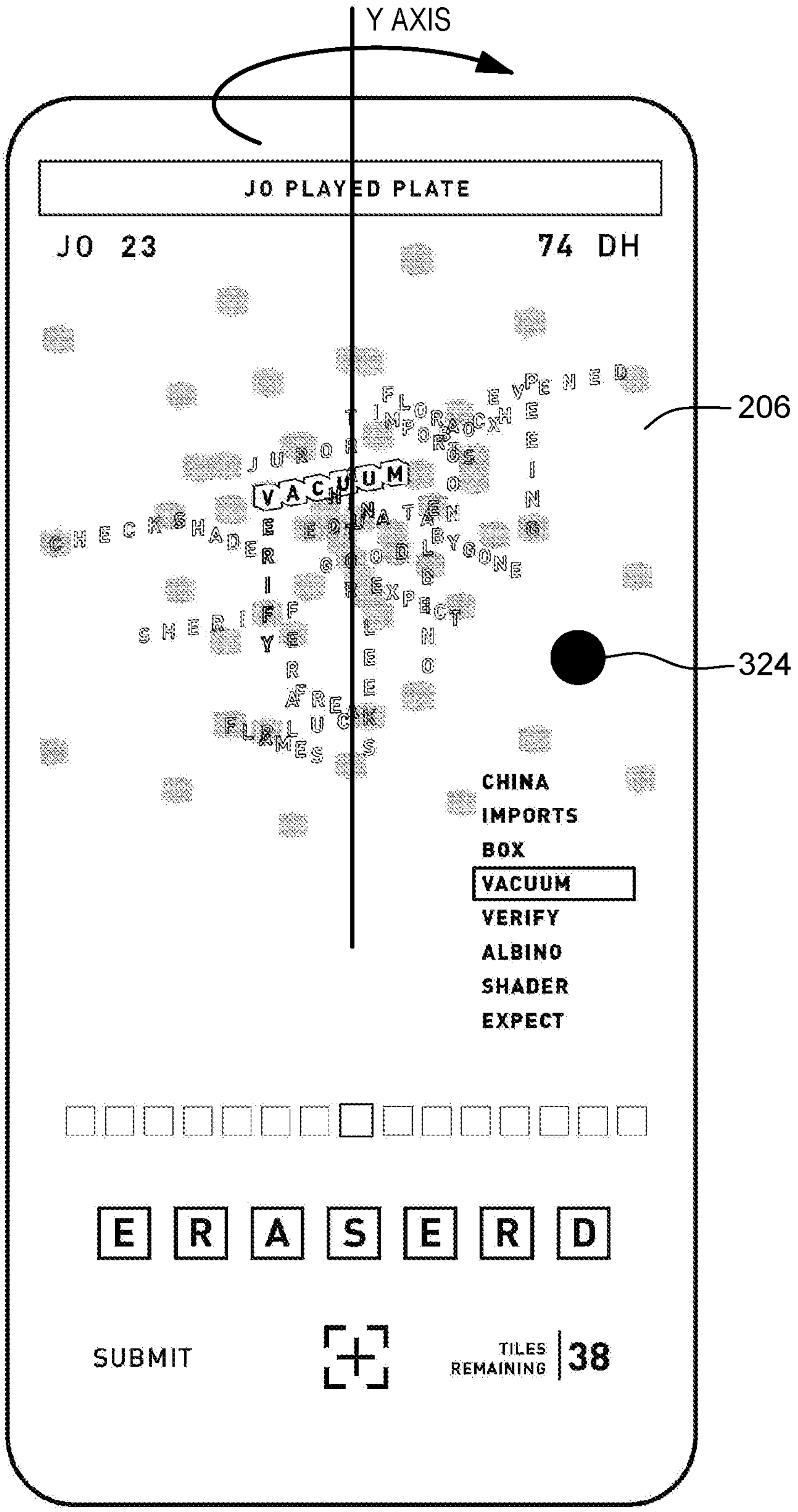

In addition, a user may rotate the display cube 206 left/right around vertical axis (Y axis) at any time while playing. In an aspect, the processor 104 may utilize rotational limit positions on each side, so that rotation of the display cube 206 may be stopped to prevent the display cube 206 from rendering played words backwards and/or from rendering played words in a stacked up fashion. In an aspect, the rotational limit position may be set at 28 degrees left or right with respect to the starting position. In an aspect, the default and optimum viewing position may render the display cube 206 rotated to the user at a 45-degree angle of rotation. It should be noted, that in various implementations other rotational limits may be used to improve readability of the data rendered by the display cube 206. The display cube 206 in FIG. 3C illustrates an exemplary original wide context view of the display cube 206. In an aspect, a user may touch 320 central portion of the display cube 206 and may move the display cube 206 towards either left or right side of the screen around the vertical axis, depending on a desired position. The display cube 206 in FIG. 3D illustrates an exemplary position of the display cube 206 after completion 324 of the rightward rotation operation 322. It should be noted that a user may stop the desired rotation at any point (as long as the game cube 206 does not move beyond the rotational limit positions) by releasing the display cube 206. By rotating the view of the display cube 206 either rightwards or leftwards around a vertical axis (Y axis), a user may get a better sense of a three dimensional position of each word within the display cube 206. It should be noted that when the display cube 206 is rotated, the letters inside the cubic elements are dynamically rotated as well to face forward towards the user so that a user never sees letters at sharper angles. Advantageously, rotating the display cube 206 left/right by even minimal amounts may create parallaxes in the plurality of cubic elements, enhancing the sense of 3D space, and/or clarifying positions of individual cubic elements as being in front of, or behind other objects, for example.

The touch screen 302 may use LCD (liquid crystal display) technology, or LPD (light emitting polymer display) technology, although other display technologies may be used in other aspects. The touch screen 302 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with the touch screen 302.

Figure 3E:
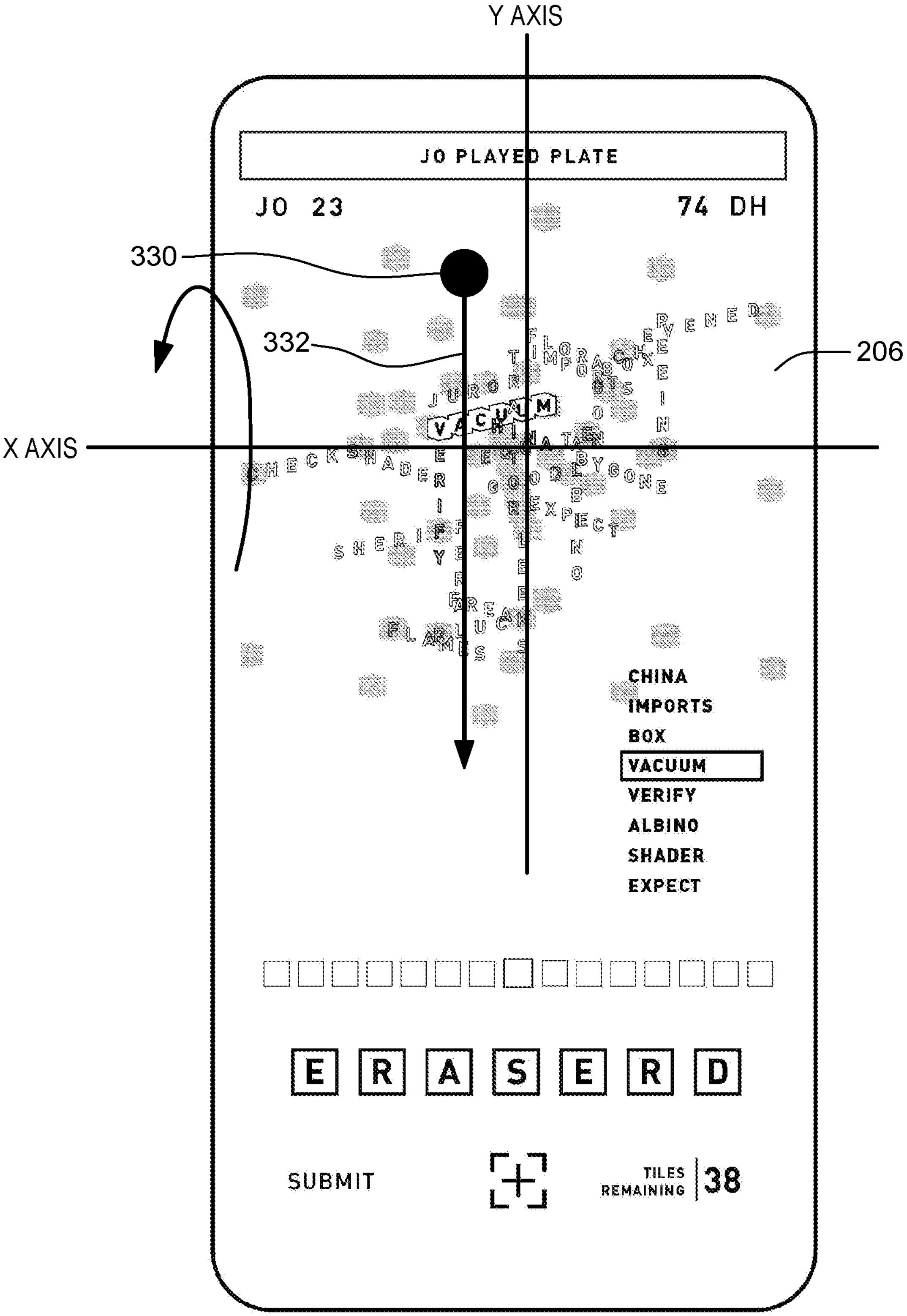
Figure 3F:
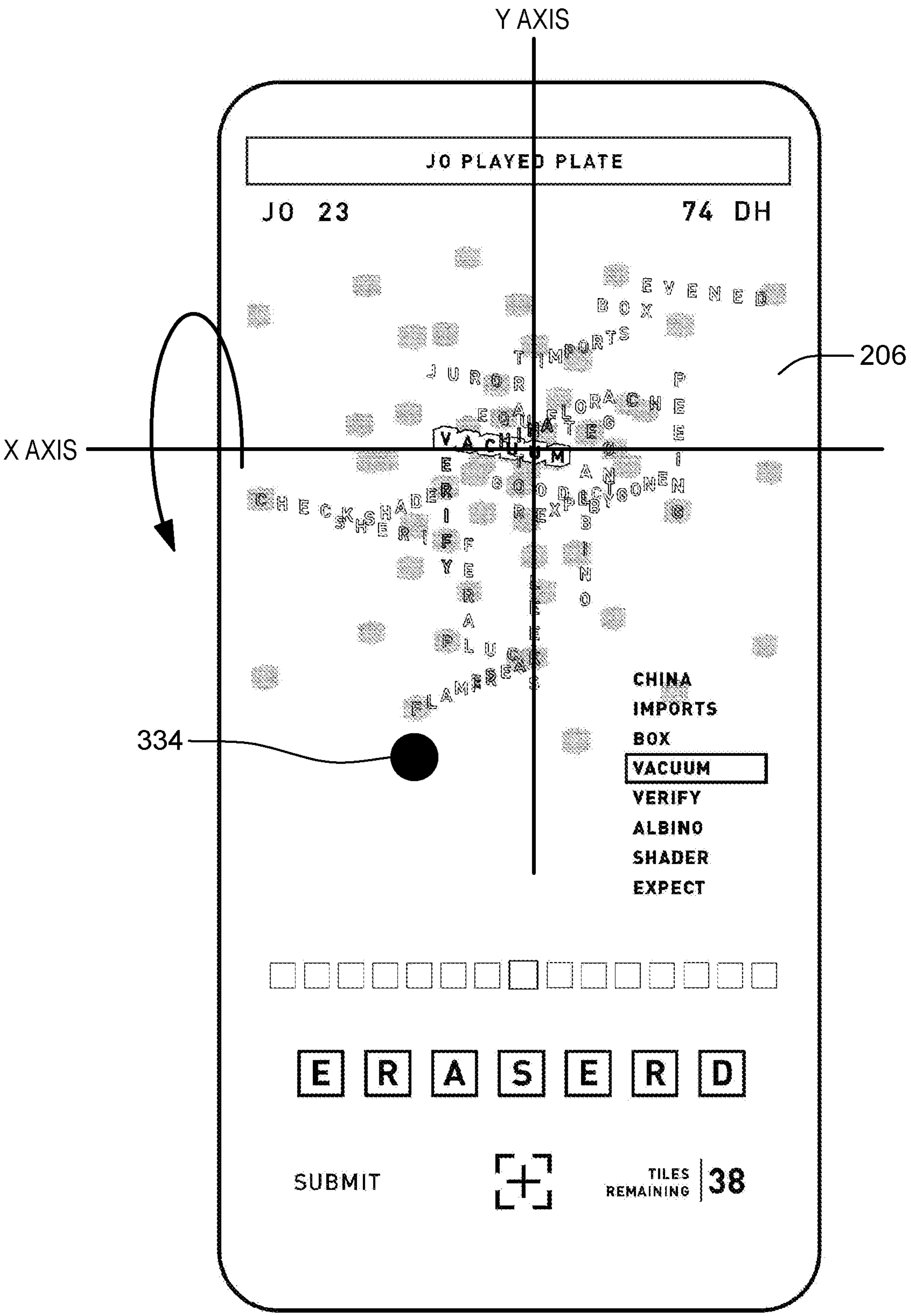

FIGS. 3E and 3F illustrate an exemplary dynamic touch and tilt operation. In an aspect, a user may touch any surface of the display cube 206 and may rotate the display cube 206 upwards or downwards around a horizontal axis (X axis), depending on a desired position. In an aspect, the display cube 206 may be rendered in either a "look up at" (display cube) or a "look down at" positions. FIG. 3E illustrates an exemplary original position of the display cube 206. A user may touch 330 a top portion of the display cube 206 and may perform a swiping motion downward to perform the downward tilt operation 332. FIG. 3F illustrates an exemplary position of the display cube 206 after completion 334 of the downward tilt operation 332 around the horizontal axis. In other words, FIG. 3E illustrates the "look up at" position and FIG. 3F illustrates the "look down at" position of the display cube 206. It should be noted, that a user may rotate the display cube 206 shown in FIG. 3F back to the original "look up at" position illustrated in FIG. 3E by touching a lower portion of the display cube 206 and by performing a swiping motion upwards. In an aspect, the display cube 206 may be viewed exclusively in the shown positions during the upwards and/or downwards rotation around the horizontal axis (X axis). In an aspect, the view shown in FIG. 3E may be default view enabling a user to look up at the display cube 206.

As noted above, a user may dynamically perform a double tap operation by double tapping central portion of the display cube 206. In response to such input, a mapping function (e.g., zoom in/out to/from a selected word) corresponding to the selected surface may be performed by the processor 104 in real time. In an aspect, in response to detecting a double tap operation, the processor 104 may automatically generate a view of the display cube 206 shown in FIG. 3B. The view shown in FIG. 3B includes a subset of information shown in FIG. 3A that is more focused or zoomed-in. For example, the processor 104 may place the selected word 318 in the center of the closer view shown in FIG. 3B. In addition, the processor 104 may identify three mutually perpendicular axes 334, 336 and 338 associated with the selected word 318. Furthermore, the processor 104 may also display one or more value cubic elements related to potential plays in the axis that is coincidental with the selected word 318. It should be noted that other play objects that either touch or are located next to the selected object 318 may be highlighted as well. FIG. 3B illustrates an example of such touching play object 340 that contains the word "verify". The close-up view generated by the double tap operation further involves animating the game cube to the close up position. This animation does not simply involve fading or popping to the new position. Instead, the animation is smooth and has an "ease-in" at the beginning and "ease-out" at the end of the move. This makes the move smooth and natural looking. These animations from one view to another occur throughout the game experience.

FIG. 3B further illustrates the crosshair object 307 and the axis picker input object 308. As shown in FIG. 3B, one of the axes of the axis picker input object 308 may be highlighted 342. In an aspect, the highlighted axis 342 may be coincident with the axis of the selected word 318 in the crosshair object 307. It should be noted that all manipulation operations of the display cube 206 that are described above (e.g., dynamic left/right rotations, touch and tilt operations, and the like) may be available in a zoomed-in view shown in FIG. 3B. This important innovation allows players to clearly see the axes available for a word play. Without it, seeing the correct play axes is very difficult. The crosshair object 307 works directly in sync with the axis picker input object 308. Players use the axis picker input object 308 to move and alter the highlight of the crosshair object 307. When the user moves the game cube side to side or up and down, the axis picker input object 308 moves in sync with it.

In an aspect, in response to detecting another double tap operation, the processor 104 may dynamically return to the wide context view (shown in FIG. 3A) of the display cube 206.

Figure 4A:
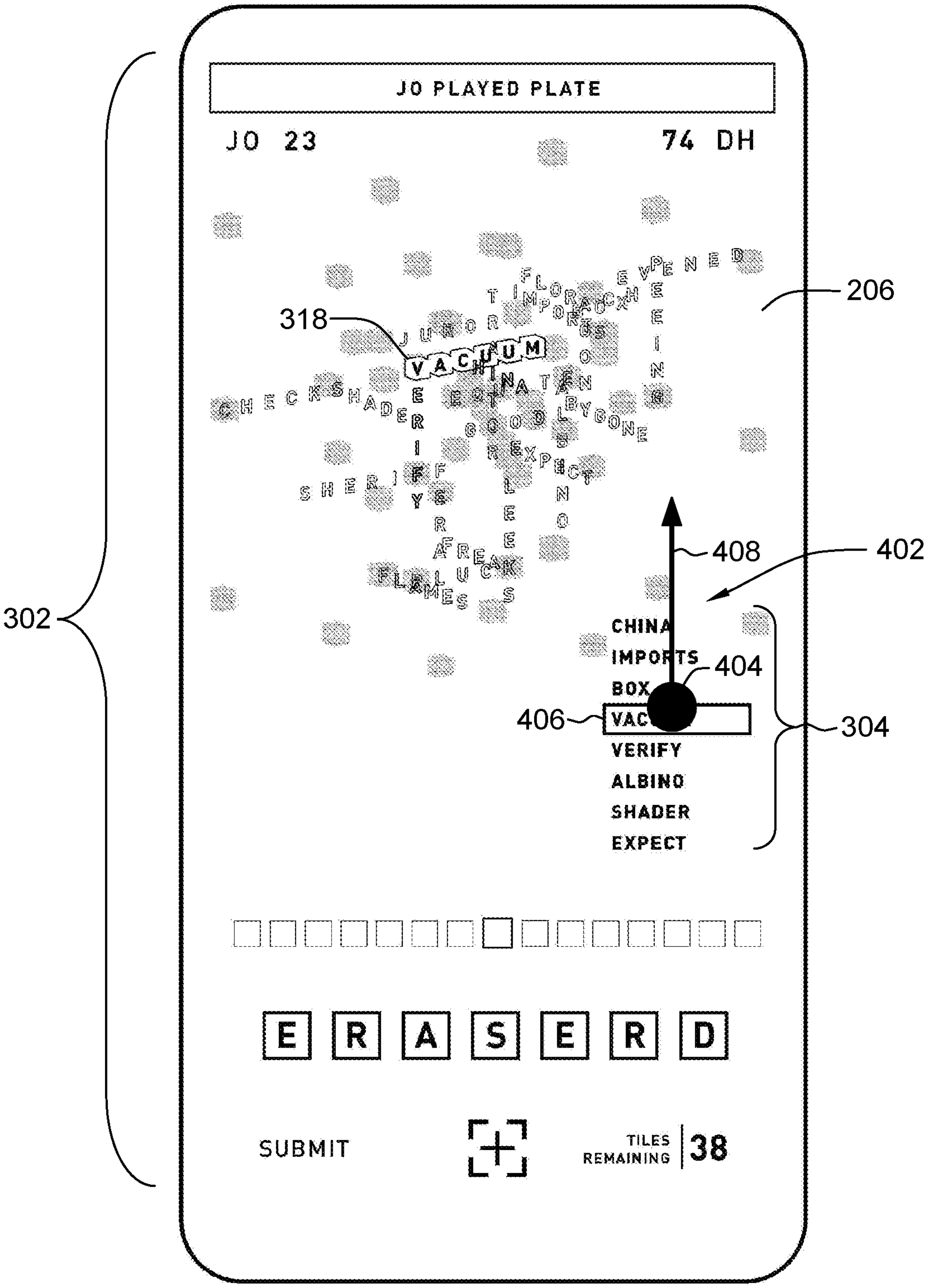
FIGS. 4A-4B illustrate navigation of word lists according to some present aspects.
Figure 4B:
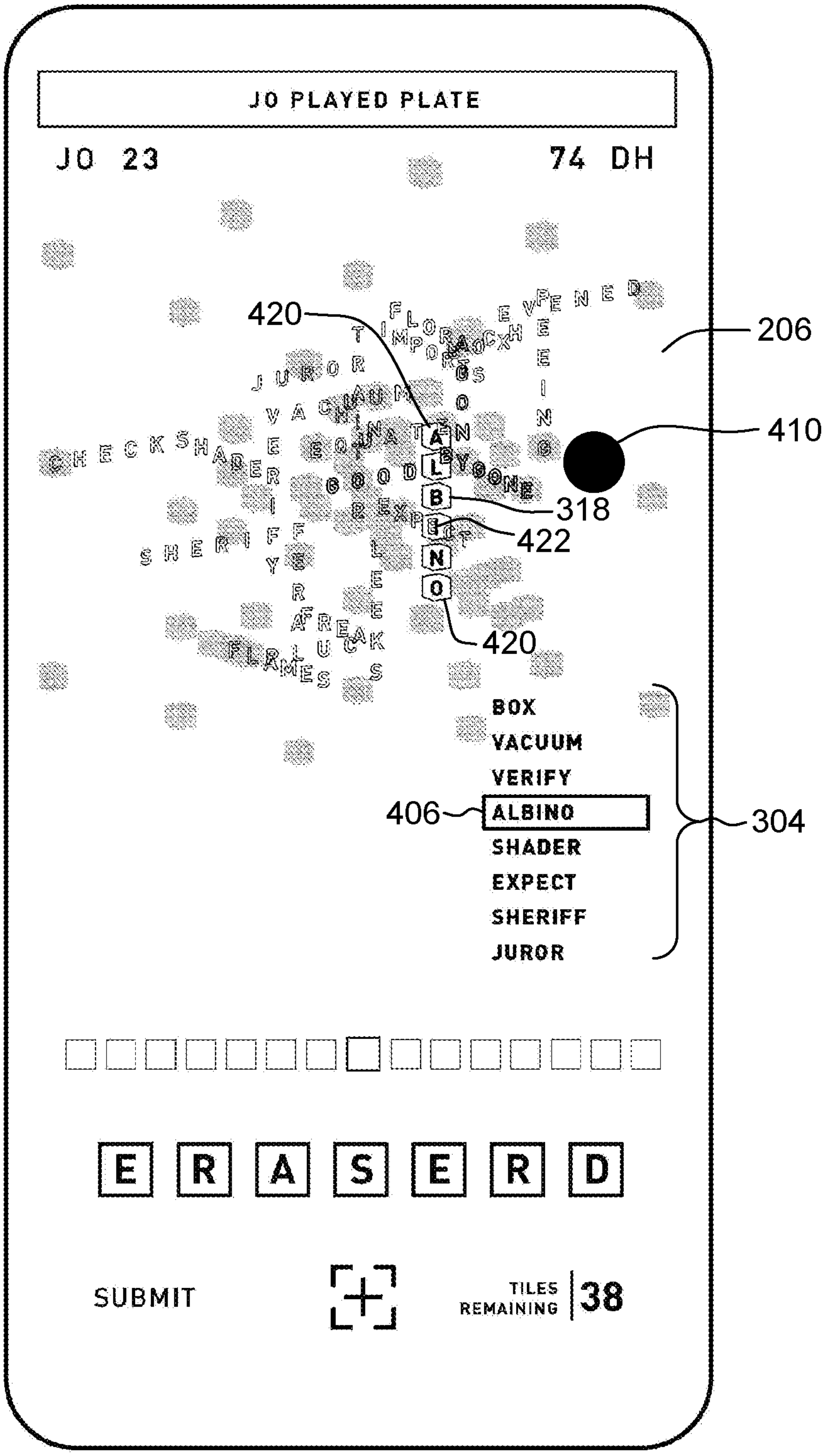

FIGS. 4A-4B illustrate navigation of word lists according to some present aspects. In an aspect, a word list input object 304 enables a user to navigate about the entire display cube 206 with a single intuitive touchscreen gesture. In an aspect, a user may tap the word list highlight rectangle 406 and move the list up or down 402 to navigate the full word list 304. For example, a user may utilize the word list 304 to redirect focus to another play object in the display cube 206. In some aspects, the list is expandable for full visibility in the close up mode, but in the full view (seeing the entire cube), the list is just visible in the area of the yellow selection rectangle. The user can move beyond that visibility area, but words in the word list are only visible in that local area of the highlight box. This is so that the list words do not obscure visibility of the display cube.

It should be noted that the word list is in order of play, with the first in the list being the first word played, and the last in the list is the last word played. An advantage of navigating this list is to "scan" through all the words. Any word that moves into the selection box is highlighted in the game cube in real time. Players can scan the list as fast they wish. In this "scanning" process, if the player slows and stops on a word, the possible value cubes that could be played fade in. The list is not visibly expandable in this wide view. That action can be done in the zoomed in mode (see FIGS. 10A-10C), where players can navigate directly to different focus words without needing to go wide to select one, using the list as a way to find another word, and then move directly to that new word in closeup play mode.

In an aspect, by default, the processor 104 may render the played words in the word list 304 for the side of display cube 206 facing the user. As shown in FIG. 4A, a user may move the word list 304 to another word position, for example, by touching 404 the highlight rectangle 406 and moving the list or a finger up 408 or down along the y-axis of the display cube 206, for example, towards position 410 shown in FIG. 4B. It should be noted that the selected word 318 in the display cube 206 corresponds to the word selected by the highlight rectangle 406.

In an aspect, in response to detecting any navigation of the word list 304 by a user, the processor 104 may automatically disable any manipulation of the display cube 206. This functionality may enable a user to navigate the word list 304 by touching over the display cube 206 area. FIG. 4B illustrates a new word selected by a user via the highlight rectangle 406. In an aspect, in response to the newly selected word in the word list 304, the processor 104 may dynamically change the selected word 318 in the display cube 206. In other words, the selected word 318 in the display cube 206 always corresponds to the selected word in the word list 304. 410 represents the end of a swipe action that had begun in FIG. 4A with finger motion 404 and moved upwards to finger position 410. Thus FIG. 4A shows the beginning of the finger/word list move and FIG. 4B shows the end of the finger movement, that resulted in the new word ALBINO being selected in the highlight rectangle and the word ALBINO being highlighted in the display cube.

Furthermore, in addition to dynamically updating the selected word 318, the processor 104 may interactively display one or more value cubic elements related to potential plays in any of the three axis associated with the selected object 318, such as, but not limited to a double letter cubic element 420 and a triple word cubic element 422. In an aspect, other value cubic elements may be selectively faded away as a user navigates the word list 304.

Figure 5A:
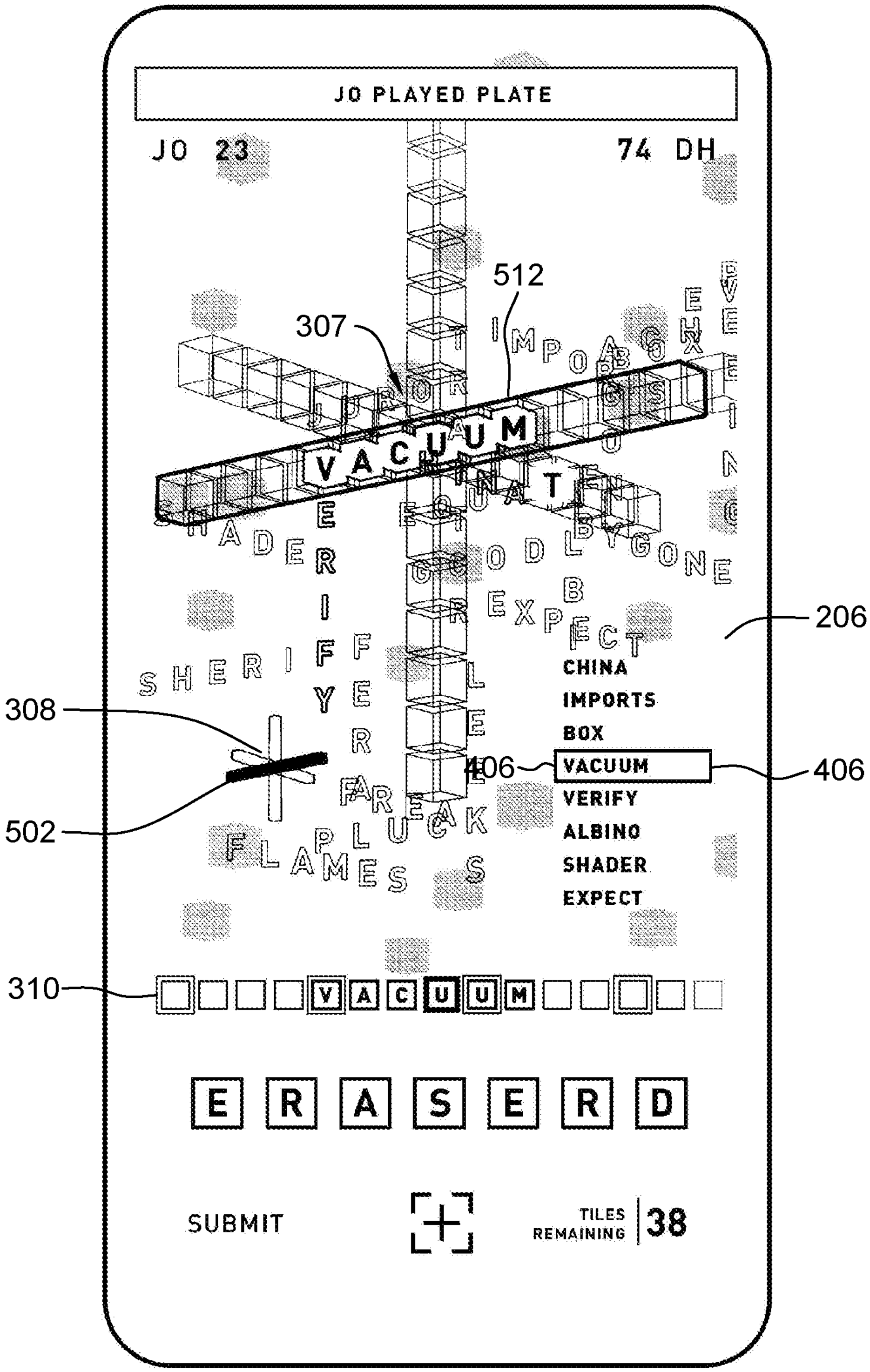
FIGS. 5A-5C illustrate manipulation of an axis picker input object according to some present aspects.
Figure 5B:
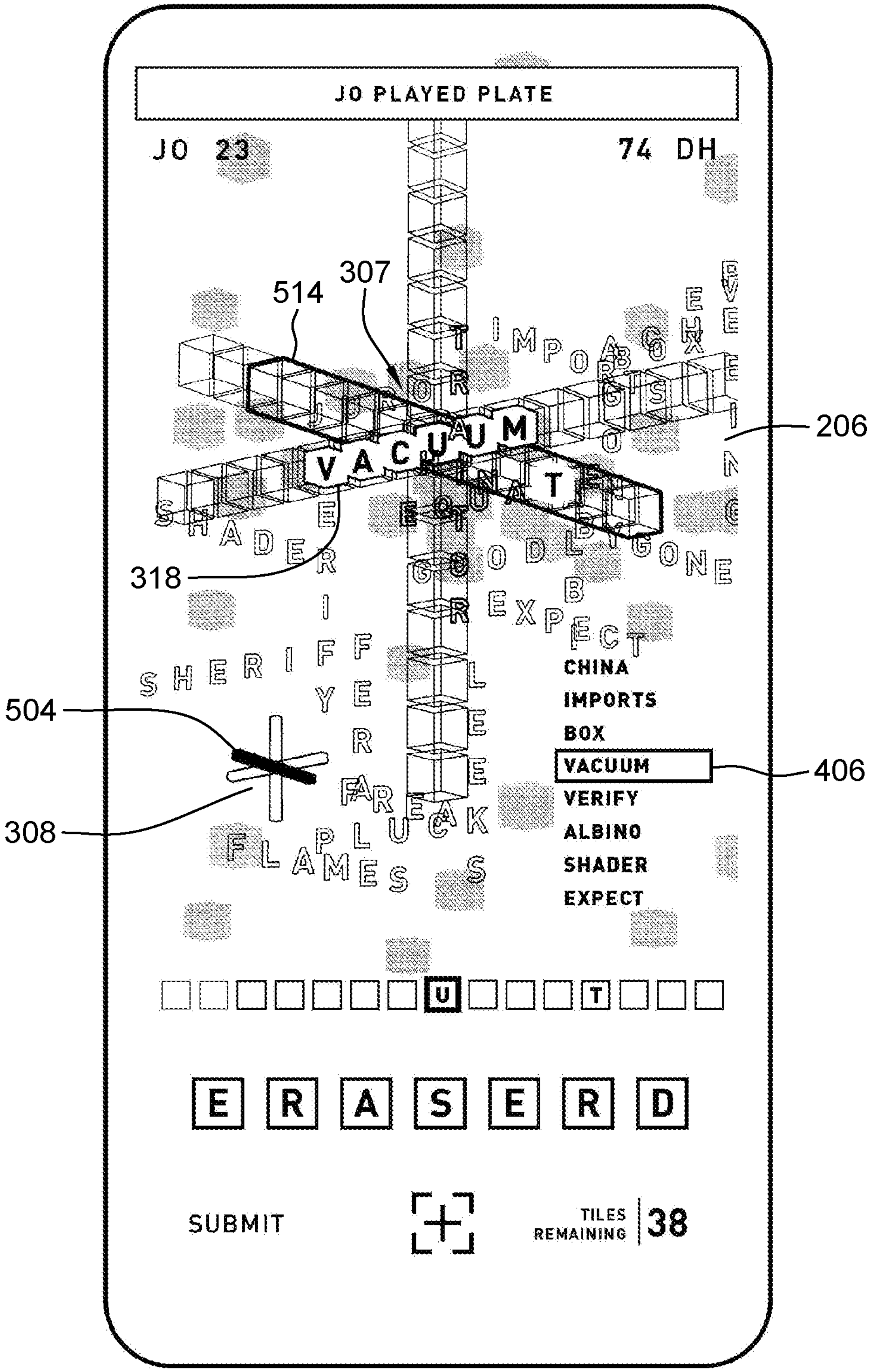
Figure 5C:
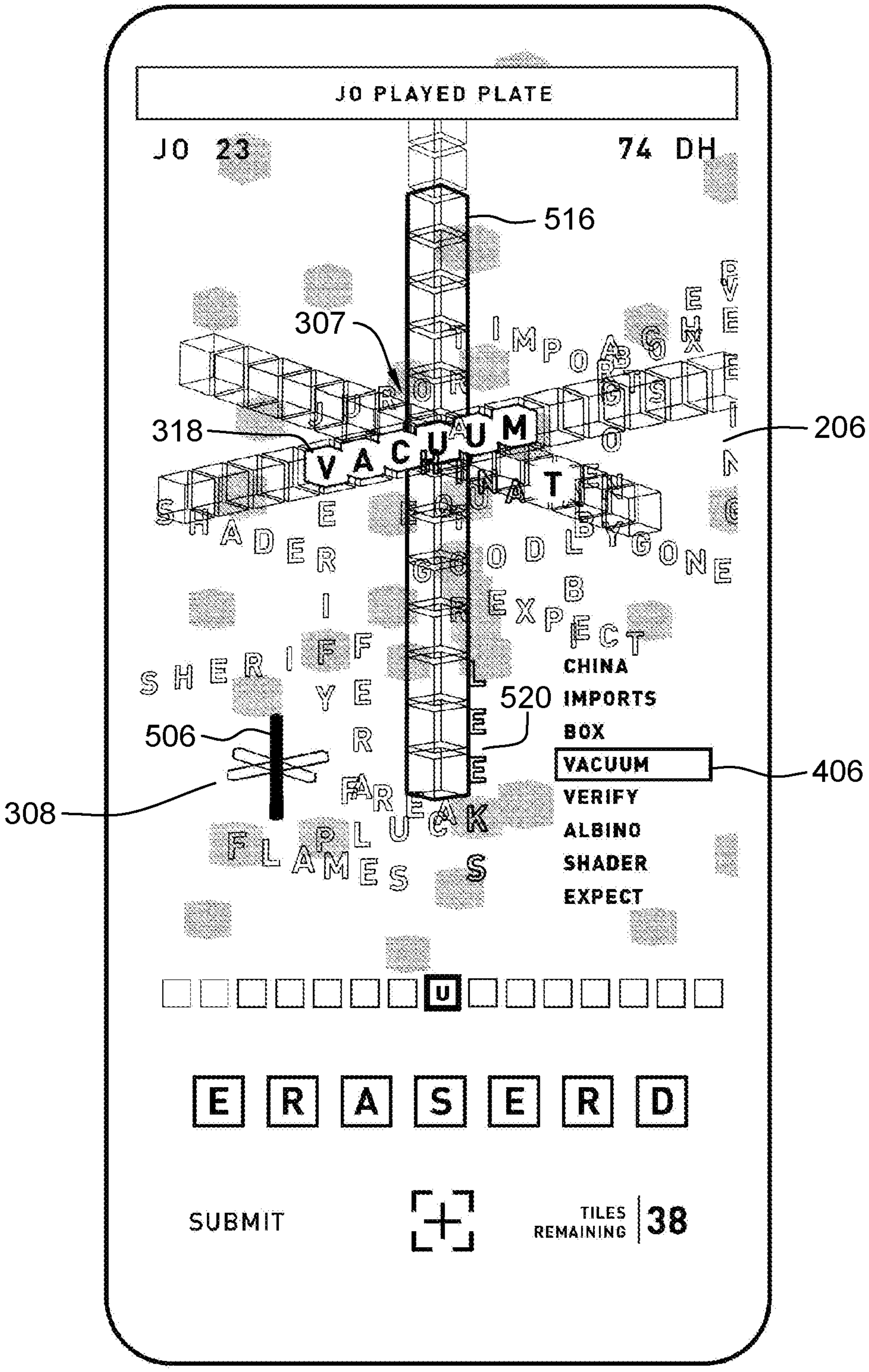

FIGS. 5A-5C illustrate manipulation of an axis picker input object according to some present aspects. Advantageously, the axis picker input object 308 is a visualization tool that enables users to visualize and select one of three mutually perpendicular axes where play can occur. As will be pointed out later, users can also move the crosshair object 307 to see "side step" (i.e., parallel) plays. Changing axis highlights or changing the positions of the crosshair object 307 is achieved with axis picker input object 308, which serves as a proxy of the crosshair object 307, which is a three-dimensional crosshair within the game cube. Both objects 307 and 308 move in sync. User actions include visualization command inputs or graphical gestures directed at the axis picker input object 308 where the processor 104 may analyze such actions. For example, if the display cube 206 is generated using X, Y, Z coordinate axes, the axis picker input object 308 may be used to select one of X, Y and Z directions within the crosshair object 307 for next game play.

A user may dynamically switch between different play axes by tapping on the axis picker input object 308.

In an aspect, the axis picker input object 308 may rotate in the same direction in 3D around the vertical axis as the display cube 206. More specifically, axis picker input object 308 moves precisely in sync with the game cube (and the crosshair object 307 inside it). This means movements and positions left/right as well as the look up and look down positions move in sync at all times.

FIGS. 5A-5C illustrate how three exemplary play axes are selected in the crosshair object 307 by interacting with the axis picker input object 308. More specifically, FIG. 5A illustrates a first axis (X axis) 512 being selected in the crosshair object 307. FIG. 5B illustrates a second axis 514 (Z axis) in the crosshair object 307 being selected. FIG. 5C illustrates a third axis 516 (Y axis) being selected in the crosshair object 307.

In an aspect, for each play, a user should select one of the three axes 502, 504 and 506 in the axis picker input object 308 corresponding to three play axes 512, 514 and 516 in the crosshair object 307 associated with the selected word 318. In response to a user selecting one of the three axes 502, 504 and 506, the processor 104 may dynamically select a corresponding axis of play associated with the selected word 318 in the display cube 206.

As shown in FIG. 5A, when the first axis 502 is selected, the processor 104 highlights the first axis 502 in the axis picker input object 308 and highlights the first play axis 512 in the crosshair object 307 using, for example, a highlight box 406. It should be noted that the word builder 310 displays all the letters that are already in place in that play axis 512, as well as any value cubic elements (if any) located in the selected axis of play (i.e., first axis of play 512 in FIG. 5A).

In an aspect, in response to user tapping the axis picker input object 308, the processor 104 may dynamically update the crosshair object 307, as shown in FIG. 5B. In FIG. 5B, the processor 104 may highlight the second axis 504 in the axis picker input object 308 and may highlight the corresponding second play axis 514 in the crosshair object 307 using the highlight box 406. As noted above, the word builder 310 displays all the letters that are already in place in that play axis, as well as any value cubic elements (if any) located in the selected axis of play (i.e., second axis of play 514 in FIG. 5B).

In an aspect, in response to user tapping the axis picker input object 308 one more time, the processor 104 may dynamically update the display cube 206, as shown in FIG. 5C. In FIG. 5C, the processor 104 may highlight the third axis 506 in the axis picker input object 308 and may highlight the corresponding third play axis 516 in the play axis manipulator object 307 using the highlight box 418. Once again, the word builder 310 displays all the letters that are already in place in that play axis, as well as any value cubic elements (if any) located in the selected axis of play (i.e., third axis of play 516 in FIG. 5C).

Advantageously, in addition to selecting the corresponding play axis in the crosshair object 307, the processor 104 may also identify and display adjacent (e.g., tangent or parallel) play objects that should be considered by a user for the selected play axis. For example, as shown in FIG. 5C, when user selects the third axis of play 516, the processor 104 may identify an adjacent play object 520 containing the word "leeks" that should be considered by a user for this play. In an aspect, the adjacent play object 520 may be presented differently to distinguish it from other play objects within the display cube 206. For example, the adjacent play object 520 may be highlighted in a brighter transparent white color or any other color.

As noted above, rotating the display cube 206 left/right by even minimal amounts may create parallaxes, enhancing the sense of 3D space, and/or clarifying positions of individual play objects. In an aspect, additional user taps may continue the cycle shown in FIGS. 5A-5C.

In an aspect, the axis picker input object 308 may also be used for selecting a play position in the selected word 318.

Figure 6A:
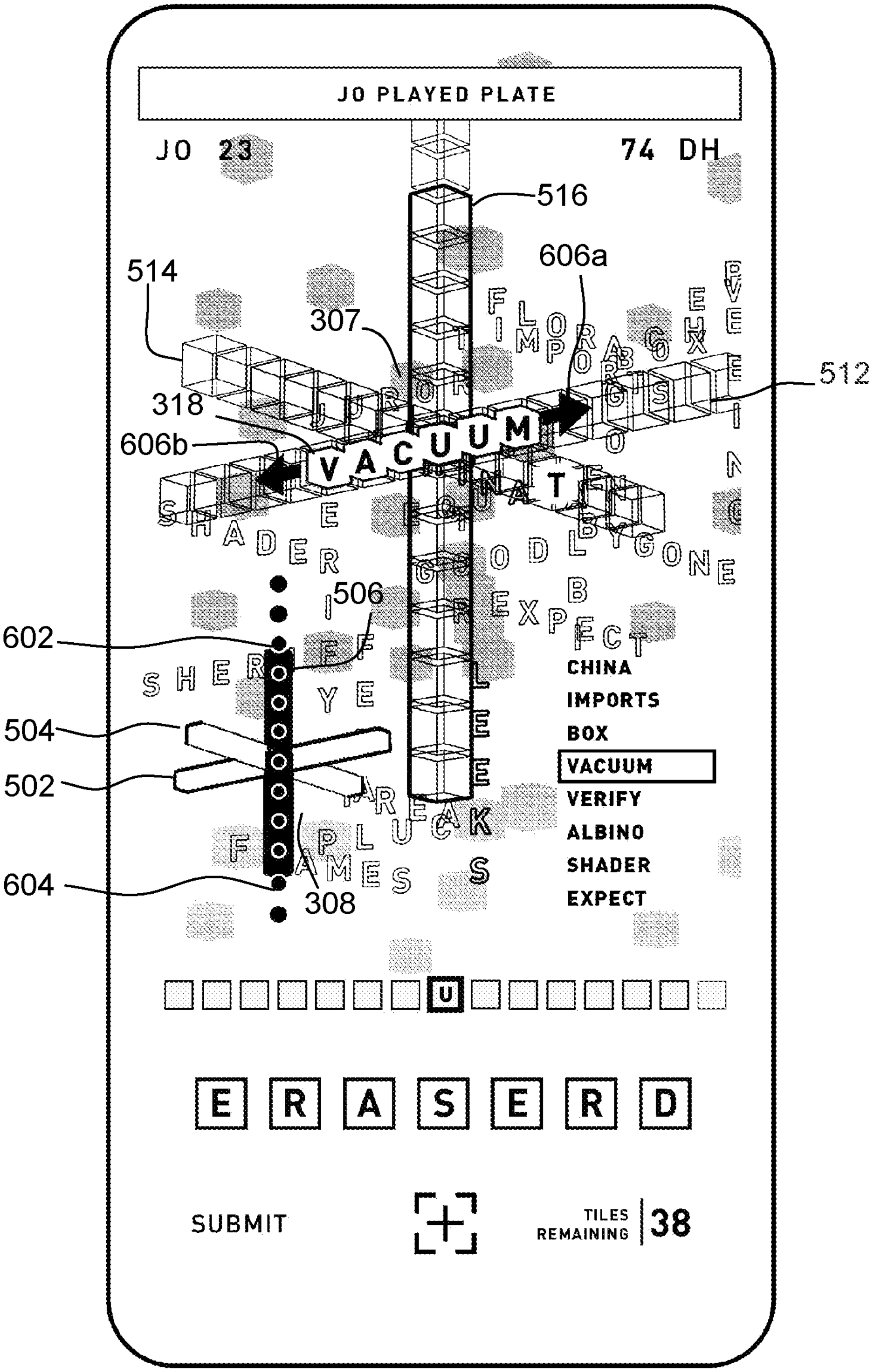
FIGS. 6A and 6B illustrate the process of selecting a play position in a selected word according to some present aspects.
Figure 6B:
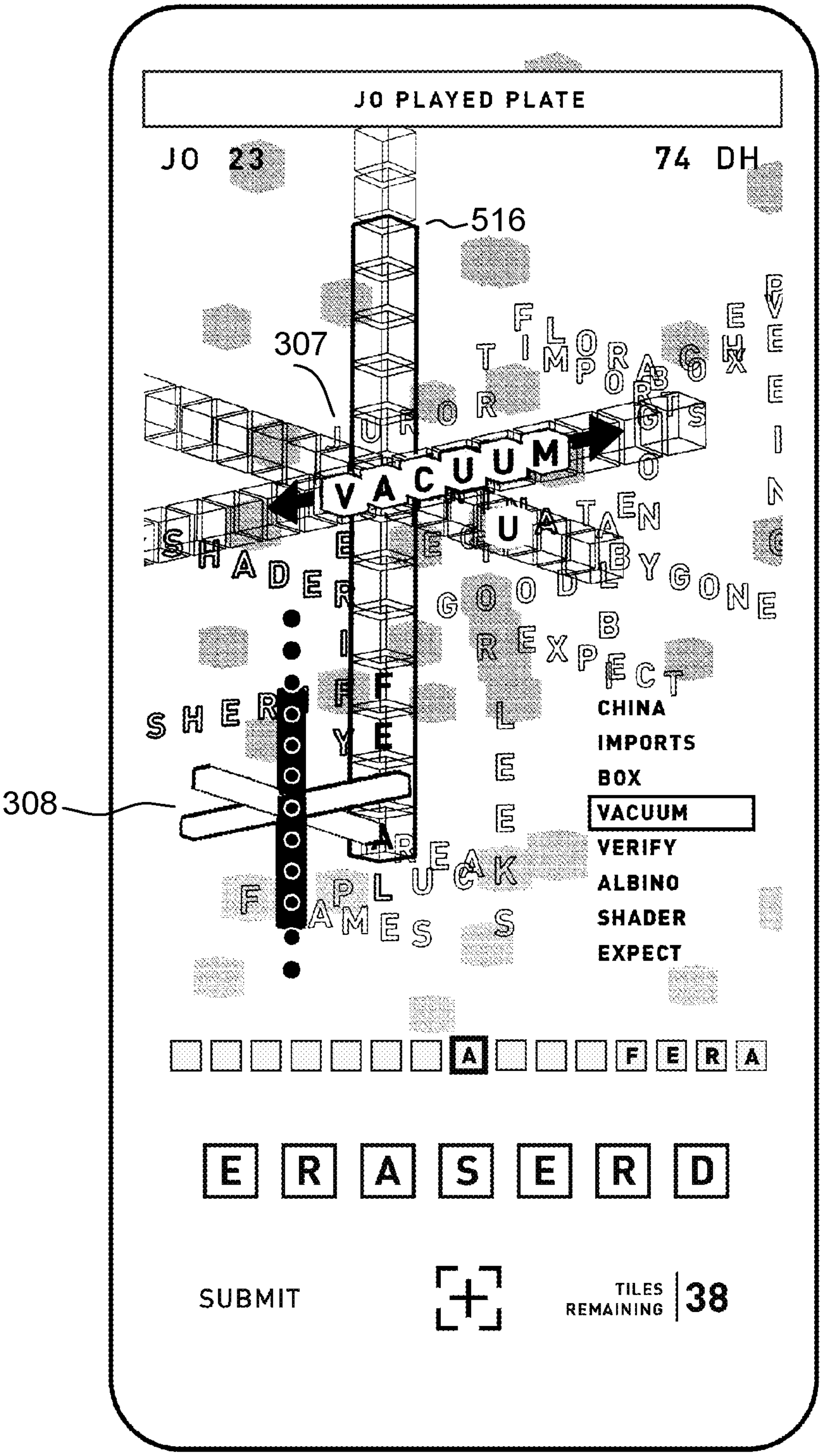

FIGS. 6A and 6B illustrate the process of selecting a play position in a selected word according to some present aspects. In an aspect, a user may select a specific letter in the selected word 318 by pressing and holding 602 the axis picker input object 308, for example with one finger. In response to user pressing and holding 602 the axis picker input object 308, the axis picker input object 308 may expand and a vertical row of dots 604 may appear extending in opposite directions from the center of the axis picker input object 308.

In an aspect, as shown in FIG. 6A, opposite arrows 606 may appear, extending in opposite directions from the selected word 318, indicating the direction of the selection. In one aspect, a user may tap the center area of the axis picker input object 308 to change the axis. When the user arrives at a desired axis, he/she may press/hold in that center position and, in response, the axis picker input object 308 enlarges and the dots appear as shown in FIG. 6A. Subsequently, the user may slide their finger up and down, respectively, from the center position to position 602, in an intuitive manner, to move the crosshair object 307 across letters of the selected word 318 in the direction of the arrows **606*a* and 606*b*. For example, by moving their finger up, a user may move a play position in the selected word 318 in the direction of the first arrow 606*a*. Conversely, by moving their finger down, a user may move a play position in the selected word in the direction of the second arrow 606*b*. For example, in FIG. 6A, the letter in the word "vacuum" along axis 516 is "u." Suppose that the user shifts his/her finger on position 602 up, the play position changes such that the letter in the word "vacuum" along axis 516 is "a." This is shown in FIG. 6B**.

It should be noted that according to rules of the game, a user may select a play position off any letter in the selected word 318, as well as the space before or after the selected word 318. For example, a user may place the letter "s" at the end of the selected word 318 to make it plural.

It should also be noted that the dots are not specific to positions (letters) in the movement across the words. They simply indicate a direction of motion for a users' finger. Thus the user can look at the game cube and the crosshair object, can see the movement, and can stop on the desired letter.

Figure 6C:
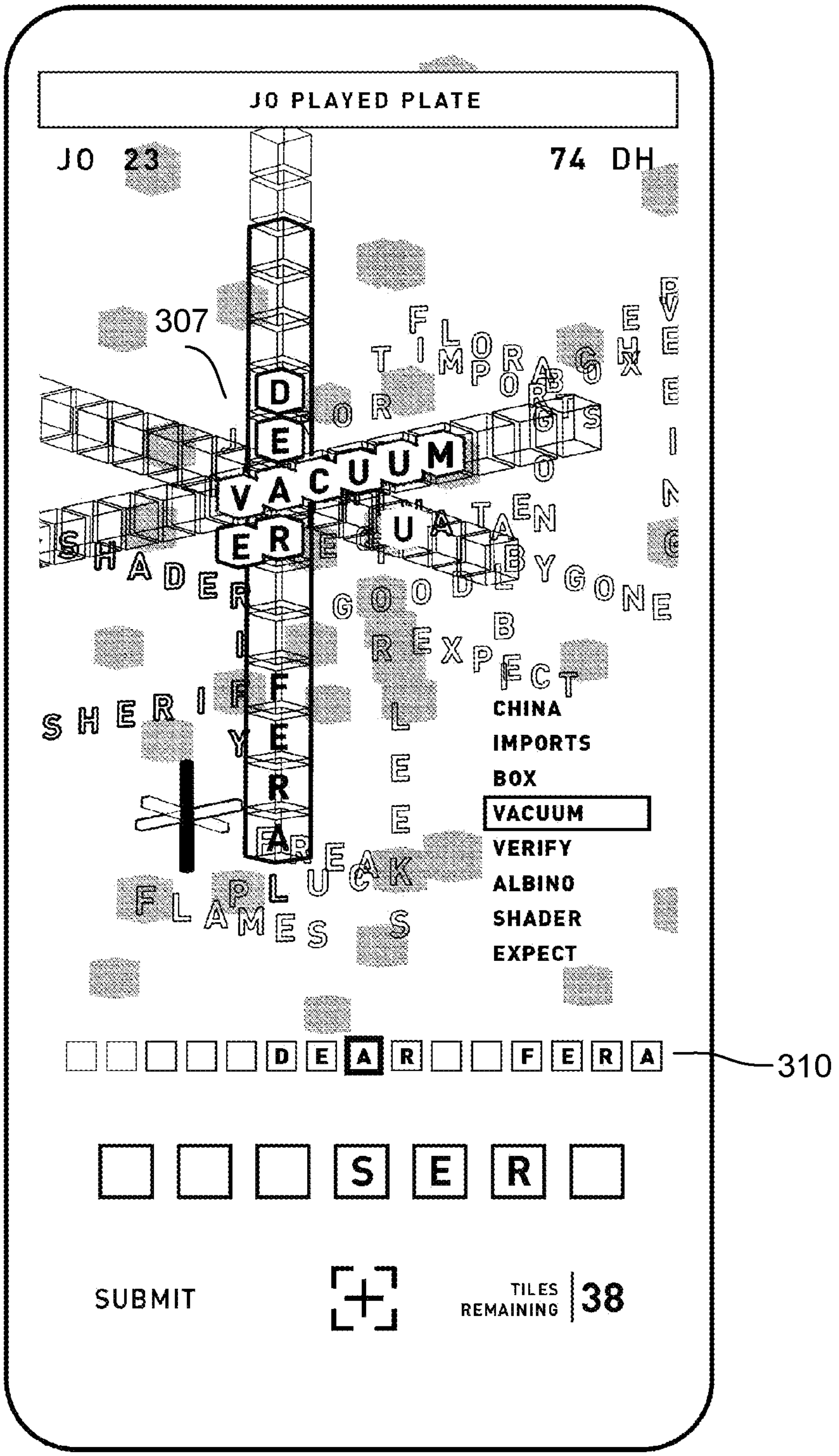
FIG. 6C illustrates the process of moving the crosshair object across the focus word to reveal positions that are perpendicular to the focus to play off.

FIG. 6C illustrates a vertical word sample play based on moving the crosshair object 307 to a position over the "a" in the word "vacuum." It should be noted that the crosshair object 307 in this position is showing the user that the word "feral" is in this same axis and needs to be considered. The letters "fera" then show up in both the crosshair object 307 and the word builder 310. Furthermore, the vertical word "verify" sits next to the axis and creates the word "er," but the main purpose of this illustrated sequence is to show that the crosshair object 307 can be moved to show a play position along any of the letters of the focus word "vacuum."

FIGS. 7A-7F illustrates different examples for performing a side step operation in a game according to some present aspects. As used herein, the side step operation enables a user to place a word parallel to a previously played word already in the display cube 206. The new word should use one of the letters in the selected word 318. More commonly, users can make a parallel word that can be adjacent above, below, or next to, the focus word.

In an aspect, a user may perform the side step operation using the selected word 318 by pressing and holding the axis picker input object 308 using two fingers in double touch 702 and 704 fashion. In response to detecting a double touch 702 and 704 of the axis picker input object 308 by the processor 104, the axis picker input object 308 may expand and a vertical row of dots 706 may appear extending in the opposite directions from the center of the axis picker input object 308.

Figure 7A:
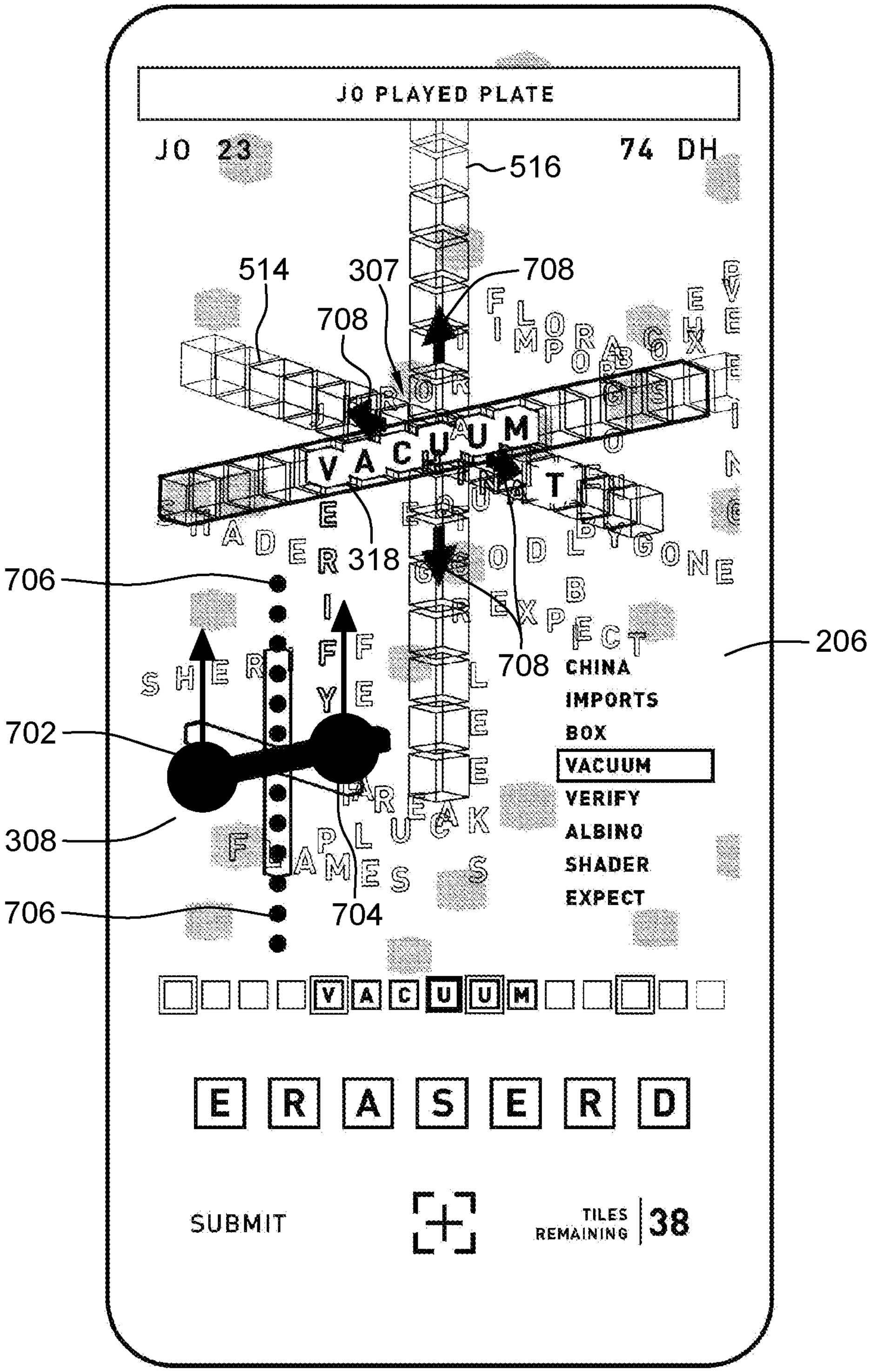
FIGS. 7A-7F illustrates different examples for performing a side step operation in a game according to some present aspects.
Figure 7B:
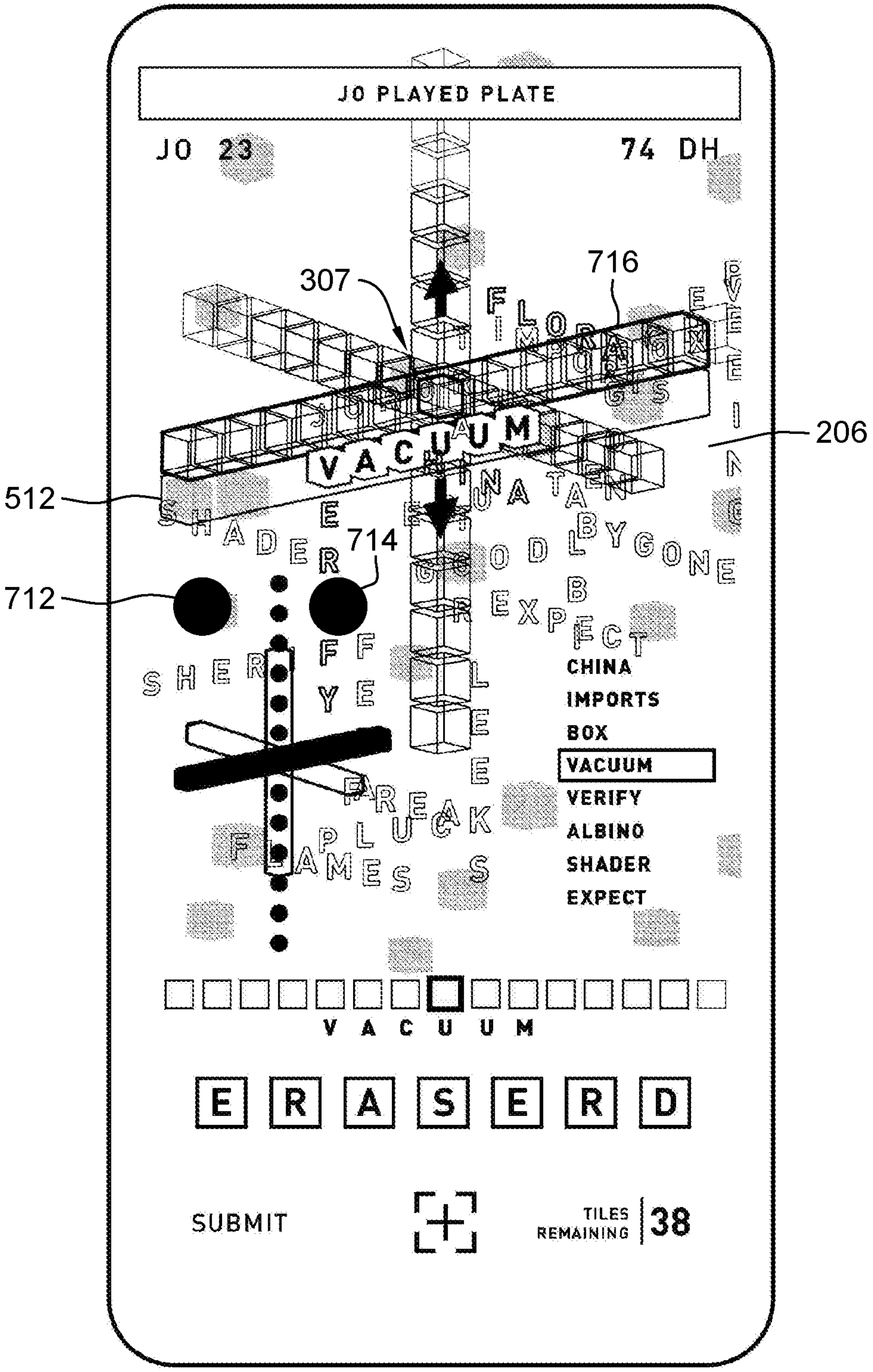

In an aspect, as shown in FIG. 7A, opposite arrows 708 may appear, extending in opposite directions from the selected word 318 along the play axes, such as the second play axis 514 and the third play axis 516 in the crosshair object 307 indicating the side step play positions. In an aspect, a user may slide both of their fingers up and down, respectively, from the double touch positions 702 and 704, in an intuitive manner to select one of the available side step play positions. For example, by moving their fingers up to positions 712 and 714 (shown in FIG. 7B), a user may shift a play axis to a substantially parallel axis 716 with respect to the original play axis (i.e., first play axis 512). Accordingly, letters of the selected word 318 may now appear essentially below the new play axis 716 within the display cube 206. It could be that in FIG. 7B, a word is played along the Z axis instead of the parallel axis to VACUUM (i.e., X axis). For example, the word may be played above the word VACUUM, with shared letter being the first U in VACUUM.

Figure 7C:
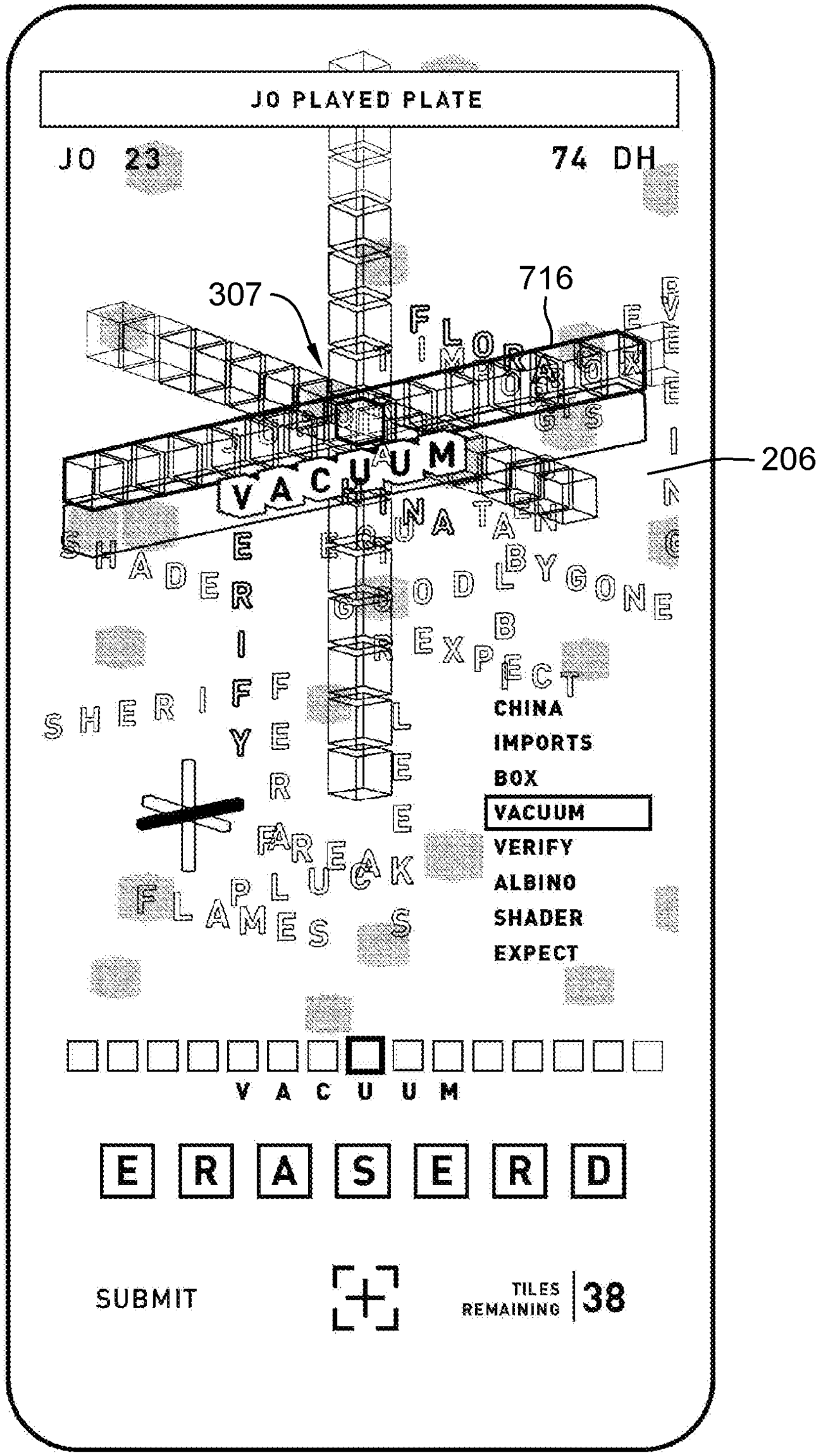

FIG. 7C simply illustrates the state of the display cube 206 after the double touch positions 712 and 714 are released and the resulting parallel axis position 716 above VACUUM where a new word could be placed.

Figure 7D:
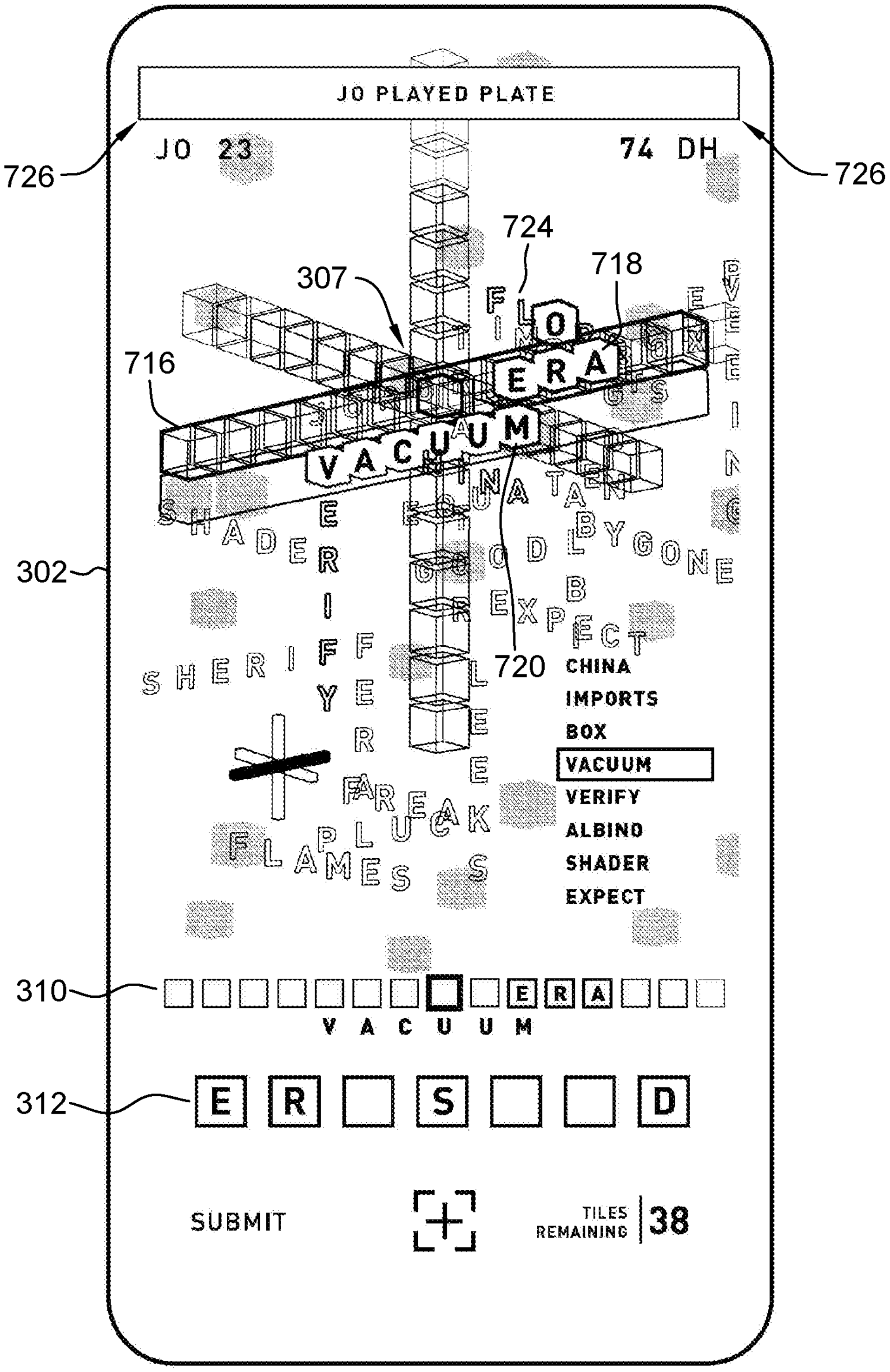

FIG. 7D illustrates that a new word (play object) "ERA" 718 may be placed into the new play axis 716 by a user utilizing the word builder 310 input object, for example. As shown in FIG. 7D, letters of the previously selected word 318 ("vacuum") may be placed below or above the input tiles of the word builder 310, depending on the newly selected play axis 716. Advantageously, such visualization technique within the word builder 310 may facilitate creation of two letter words created as a result of user input.

It should be noted that in an aspect, the processor 104 may automatically validate user input. In the example illustrated in FIG. 7D, the processor 104 may validate the words "ERA" 718 and "EM" 720 created by a user. It should be noted that letter "O" in the play object containing the word "FLORA" 724 may be created as a result of placing the letter "R" in the play object 718 containing the word "ERA."

In an aspect, the processor 104 may be configured to validate words using a dictionary, such as but not limited to Scrabble® dictionary, which may be stored in the computing device's memory 102. In response to validating a particular word, the processor may highlight the validated word. In an aspect, the highlighted words may be color coded. For example, play objects 718 and 720 may be highlighted in orange if the words contained in the corresponding play objects are valid words.

In addition, the processor 104 may be configured to calculate the score for each of the newly created words. In an aspect, the processor 104 may display the score for this particular play and may render the score in a location just below a message bar object 726 that may be positioned at the top of the touch screen 302.

Figure 7E:
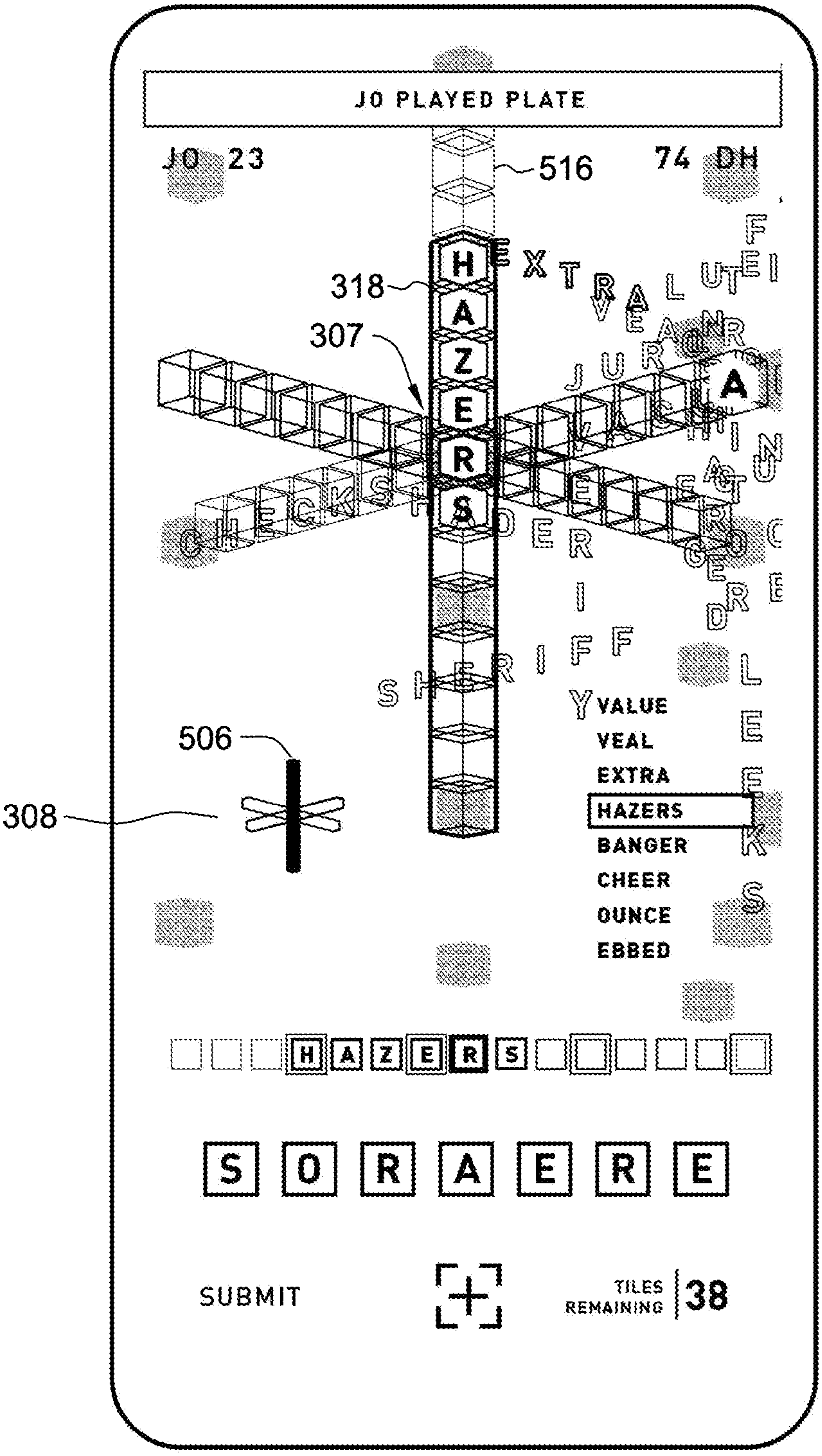
Figure 7F:
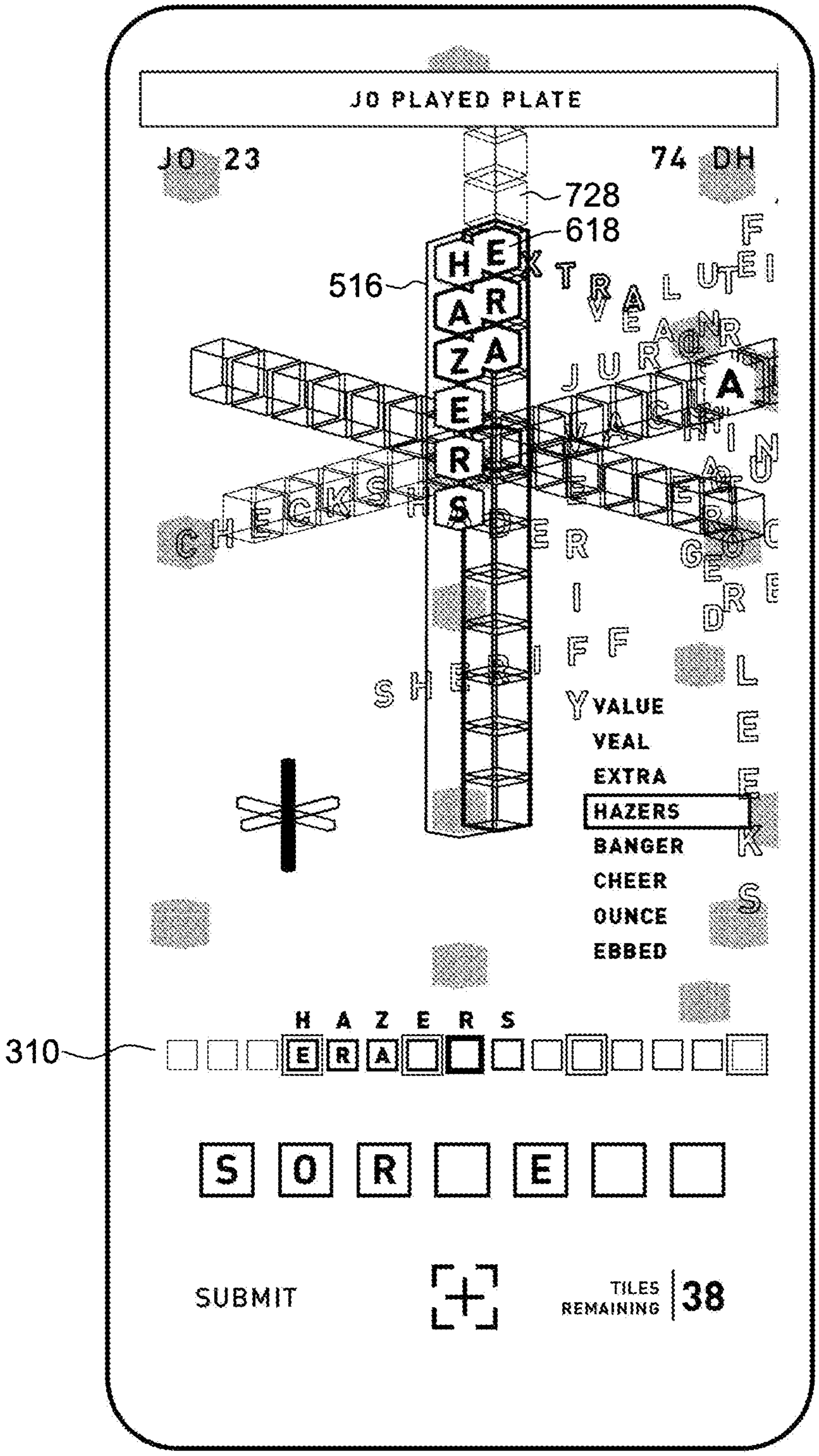

FIGS. 7E and 7F illustrate a side step operation in a game using the vertically positioned selected word 318 according to some present aspects. In FIG. 7E, the selected word 318 is positioned along the third axis 516 of the crosshair object 307. In an aspect, a user may perform a vertical side step operation, which results in the depiction of FIG. 7F. FIG. 7F illustrates that a new word (play object) "ERA" 618 may be placed into the new play axis 728 by a user utilizing the word builder 310 input object, for example. More specifically, FIGS. 7E and 7F are given to show the original position of the vertical word HAZERS, and the result of completing a sidestep to the parallel word ERA.

As shown in FIG. 7F, in this case, letters of the previously selected word 318 ("hazers") may be placed above the input tiles of the word builder 310. Advantageously, such visualization technique within the word builder 310 may facilitate creation of two letter words created as a result of user input. As described above, the processor 104 may validate the user input and may highlight valid newly entered words.

Figure 8A:
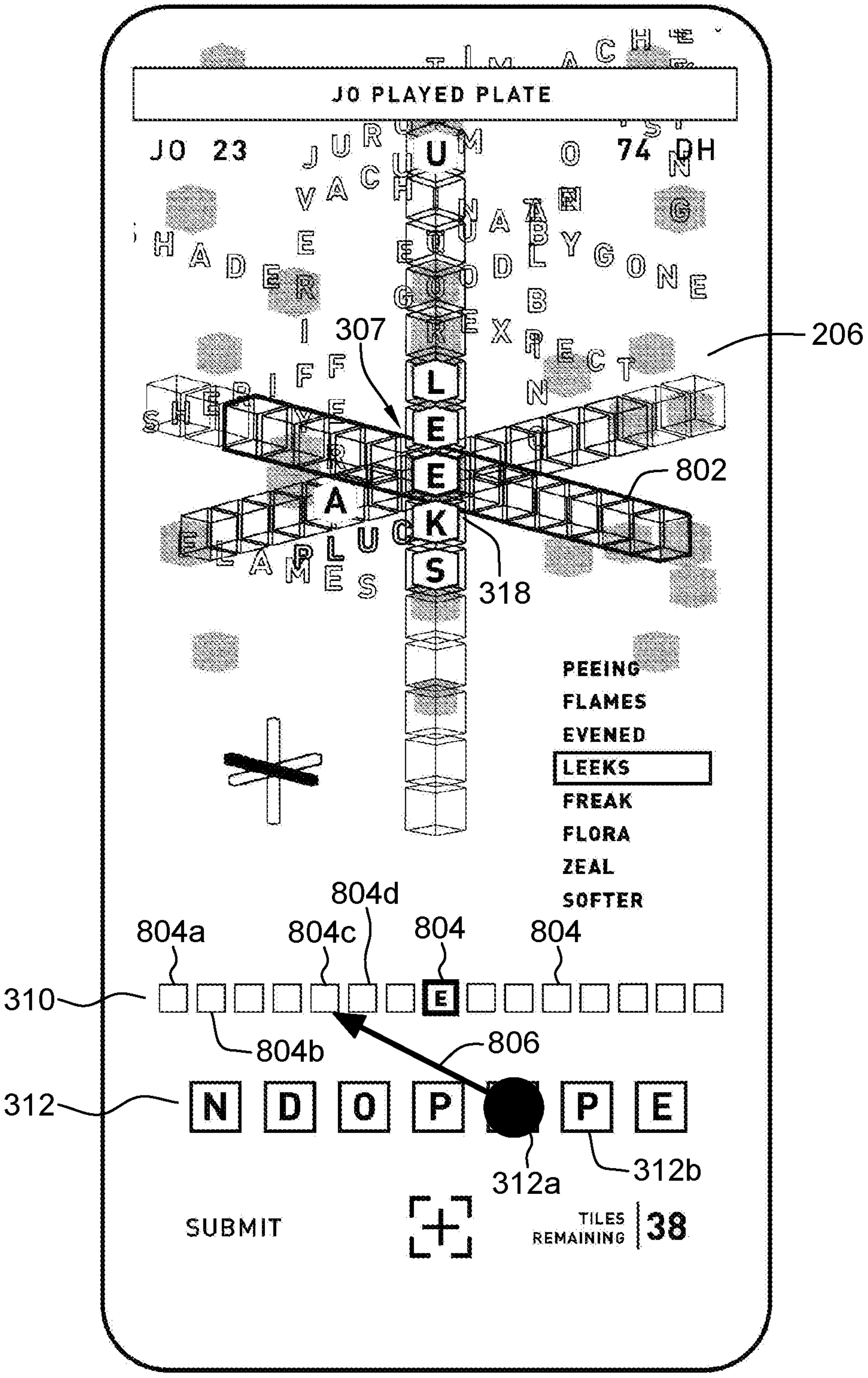
FIGS. 8A-8D illustrate manipulation of a word builder input object according to some present aspects.

FIGS. 8A-8D illustrate manipulation of a word builder input object according to some present aspects. More specifically, FIG. 8A illustrates how a user may place letters into the selected play axis 802 corresponding to the selected word 318. In an aspect, the word builder input object 310 may include a plurality of word builder tiles 804. Each word builder tile 804 may represent a particular play position in the selected play axis 802. In an aspect, the word builder 310 serves as a proxy of the selected play axis 802 of the display cube 206. More specifically, the word builder 310 may display value cubic elements (if any) that are in play and are located in the selected play axis 802, as well as new and previously played letters in the selected play axis 802.

In an aspect, a user may input letters into the tiles 808 within the word builder 310 using the input tiles 312. As noted above, at the start of the game, the processor 104 may assign a predefined number (for example, seven) randomly generated letters to the input tiles 312 for each player participating in the game. In an aspect, the input tiles 312 may contain letters of a particular alphabet. In an aspect, the alphabet may be a Latin alphabet. Examples of Latin-alphabet based languages include, but are not limited to, English, German, Dutch, Danish, Swedish, Norwegian, French, Spanish, Portuguese, Italian, etc. However, aspects of the present disclosure are not limited to Latin-based alphabet languages and may work with any other language that may be used for playing Scrabble®.

In the example illustrated in FIG. 8A the selected word 318 may be located close to the edge of the display cube 206. Accordingly, the word builder 310 may indicate to a user only available word builder tiles 804. For example, the processor 104 may dim back the two leftmost word builder tiles 804*a* and 804*b* to indicate that the corresponding 3D positions extend beyond the edge of the display cube 206 and are not considered to be play positions.

In an aspect, a user may press and hold a desired input tile 312, such as input tile 312*a* and may move 806 (for example, by dragging) the desired input tile 312*a* to the desired word builder tile 704, such as word builder tile 804*c*, within the word builder 310 as shown in FIG. 8A. Similarly, a user and may move 806 the input tile 312*b* to the word builder tile 804*d*.

Figure 8B:
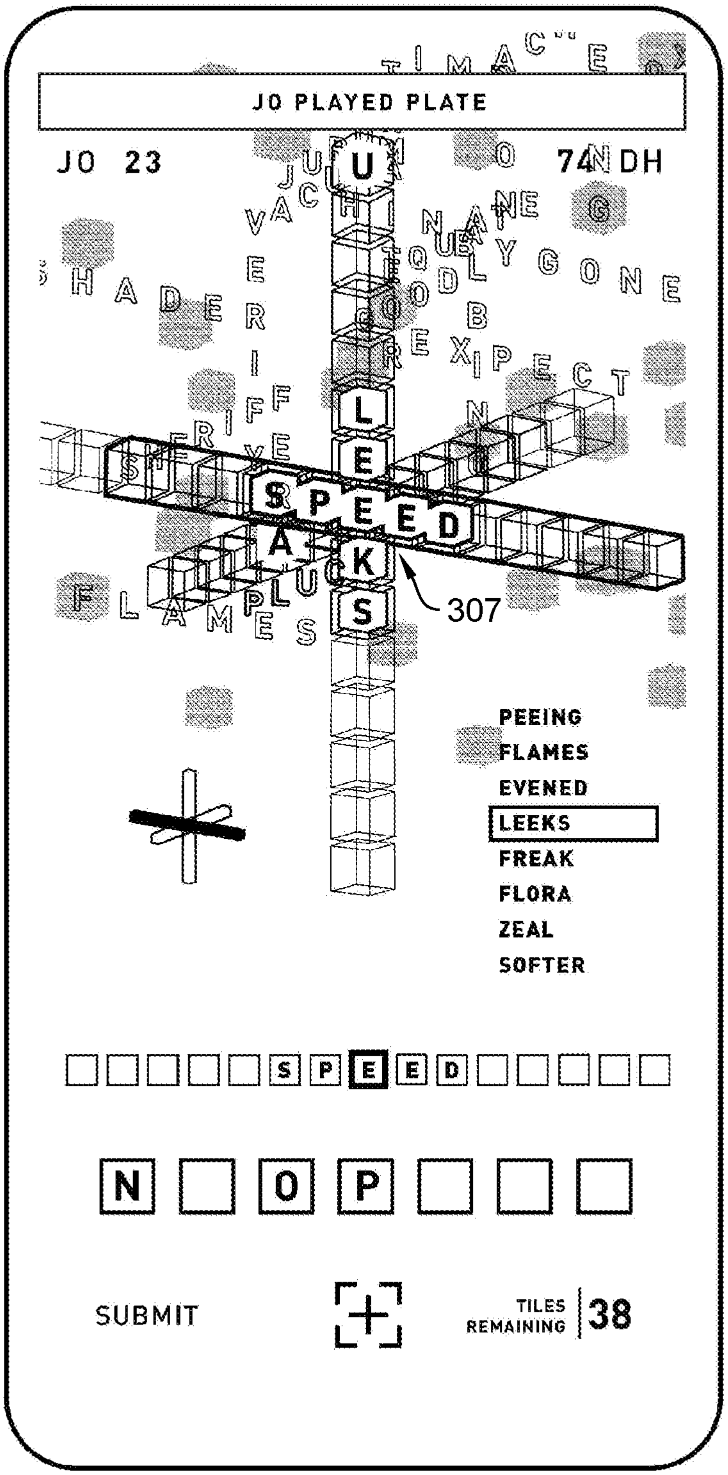

In an aspect, in response to detecting the move 806 of one of the input tiles 312 to the word builder 310, the processor 104 may dynamically display the corresponding letter in the corresponding play position within the selected play axis 802 of the crosshair object 307, as shown in FIG. 8B.

Figure 8C:
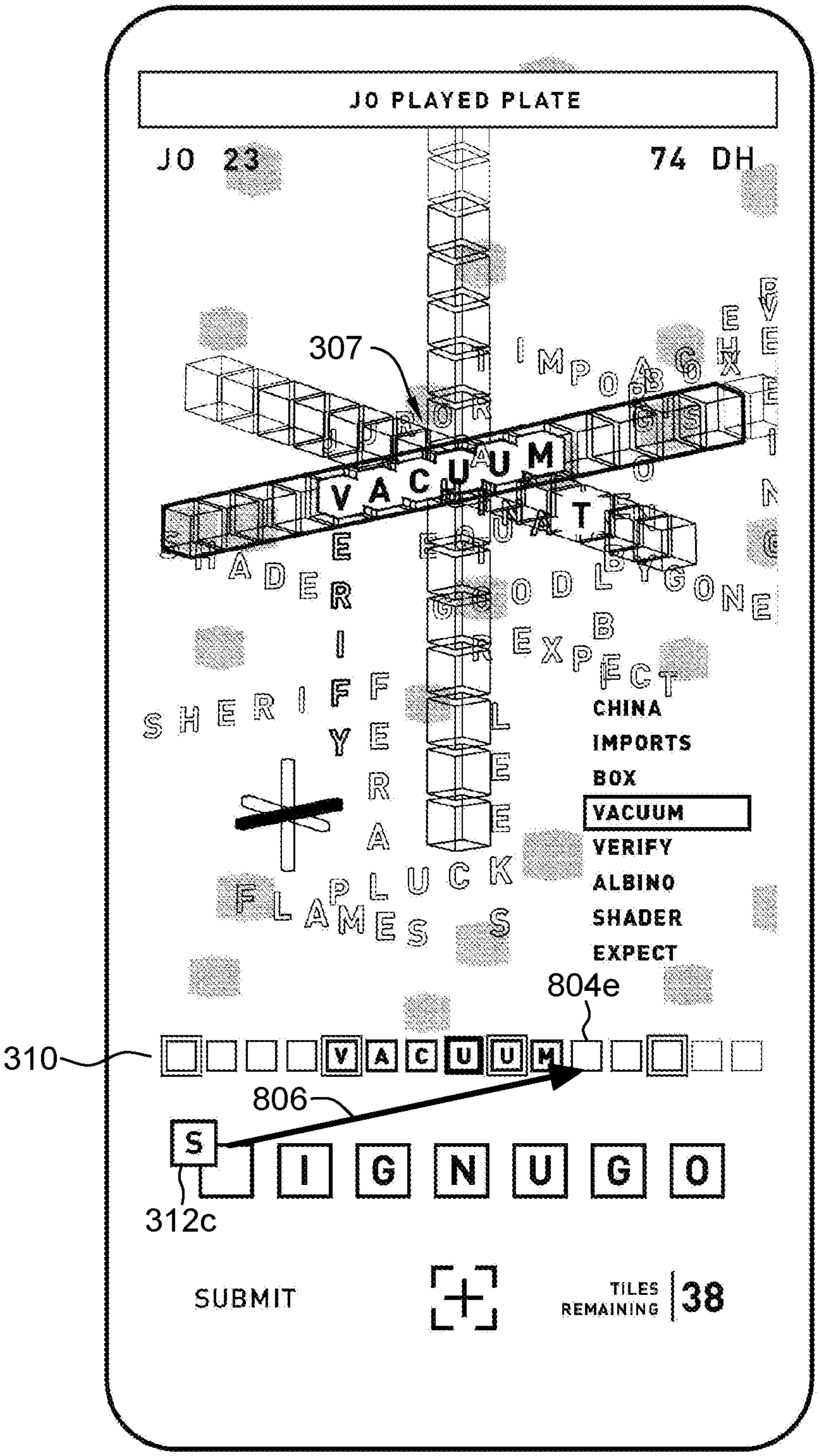
Figure 8D:
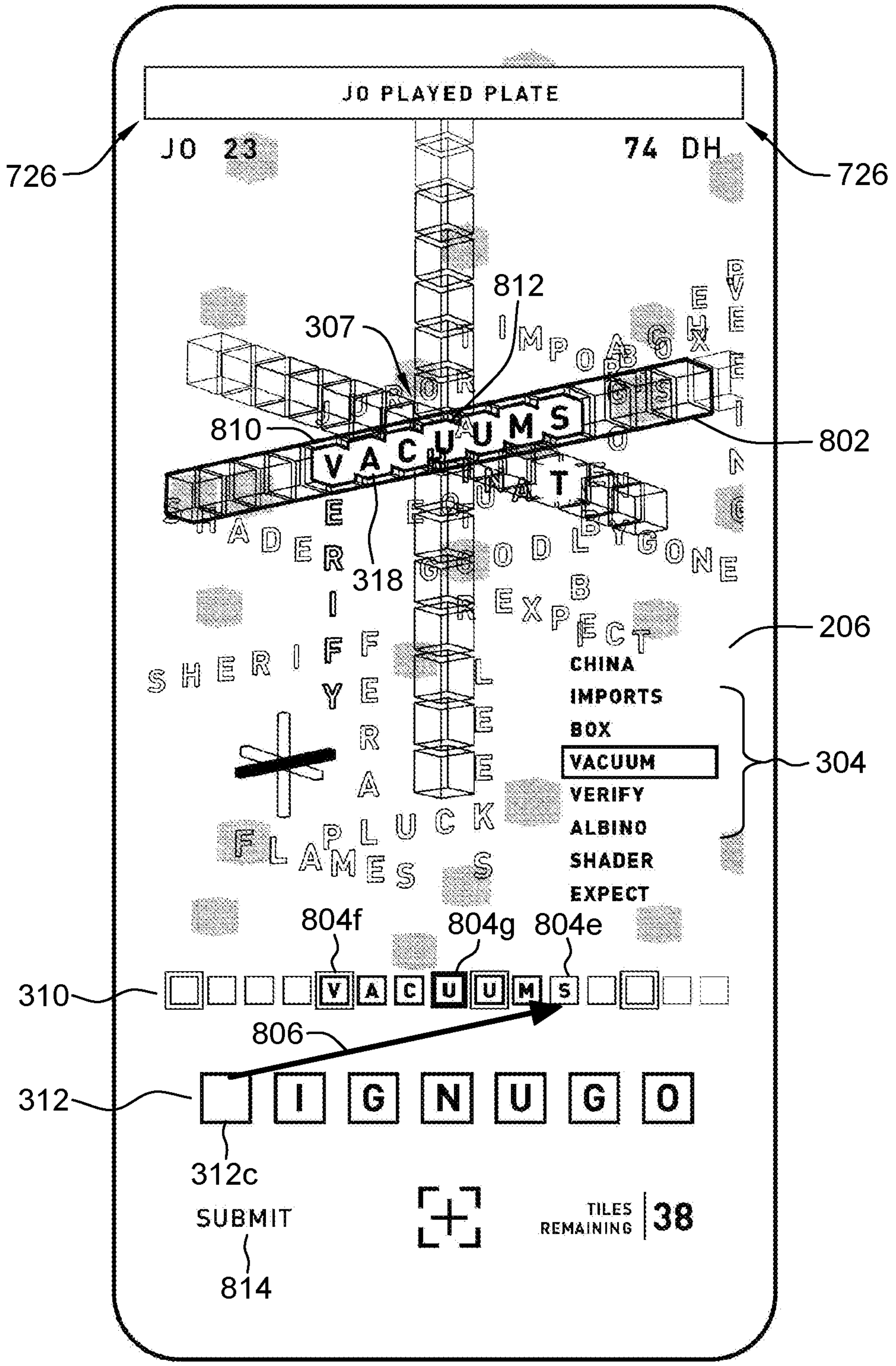

FIGS. 8C and 8D illustrate another example of interactive input of letters using the word builder 310. In this case, a user and may move 806 the input tile 312*c* to the word builder tile 804*e*. In response to detecting the move 806 shown in FIG. 8D, the processor 104 may add letter "s" at the end of the selected word 318, making it plural. In an aspect, play object 318 may be highlighted in orange indicating that the word contained in this play object is a valid word.

In an aspect, a user may have an option of moving back the newly placed letters in the word builder 310 by double tapping them. For example, a user may double tap the word builder tile 804*e* to remove letter "s" from the selected word 318 back to the input tile 312*c*, until the current play is submitted to the system. In an aspect, the letter in the newly played input tile 312, such as tile 312*c*, may be replaced by a user swiping 708 two fingers downwards from the word builder 310. In an aspect, in response to detecting a touch input, the processor 104 may wait for a predetermined period of time (e.g., a few milliseconds) to check whether a second touch input is detected. In response to detecting the second touch input, the processor 104 may assign a new letter to the empty input tile 312*c*.

In an aspect, the processor 104 may color code word builder tiles 804 to indicate to a user positions of the corresponding value cubic elements (if any) that are in play and located in the selected play axis 802. For example, if the first value cubic element 810 is light blue indicating a double letter cubic element, the processor 104 may render the corresponding word builder tile 804*f* in light blue color as well. Similarly, if the second value cubic element 812 is pink indicating a double word cubic element, the processor 104 may render the corresponding input tile 804*g* in yellow color as well, and so on. Advantageously, the word builder 310 may act as a proxy of the selected play axis 802 of the crosshair object 307. In other words, the processor 104 may employ the word builder 310 to simplify the process of placing desired letters into the 3D display cube 206 by performing substantially simultaneous updates of the word builder 310 and the corresponding selected play axis 802 within the crosshair object 307.

In an aspect, a user may submit a desired play by pressing a submit button. In response to user pressing the submit button 814, the processor 104 may calculate the score for the submitted play and present the calculated score via the message bar object 726. In addition, the processor 104 may dynamically append the newly created word to the word list 304.

FIGS. 9A-9D illustrate selective display of adjacent words according to some present aspects.

In an aspect, in order to improve interactivity with the display cube 206, the processor 104 may selectively display only play objects that are meaningful to the specific axis selected by a user. In the example shown in FIG. 9A, a user may have selected the first play axis 901 within the crosshair object 307. In response to that selection, the processor 104 may display previously played words "JUROR" 902 and "TRAITOR" 904. The word "JUROR" 902 is adjacent in 3D space and parallel to the selected play axis 901. The word "TRAITOR" 904 is intersecting and is perpendicular to the selected play axis 901.

Figure 9A:
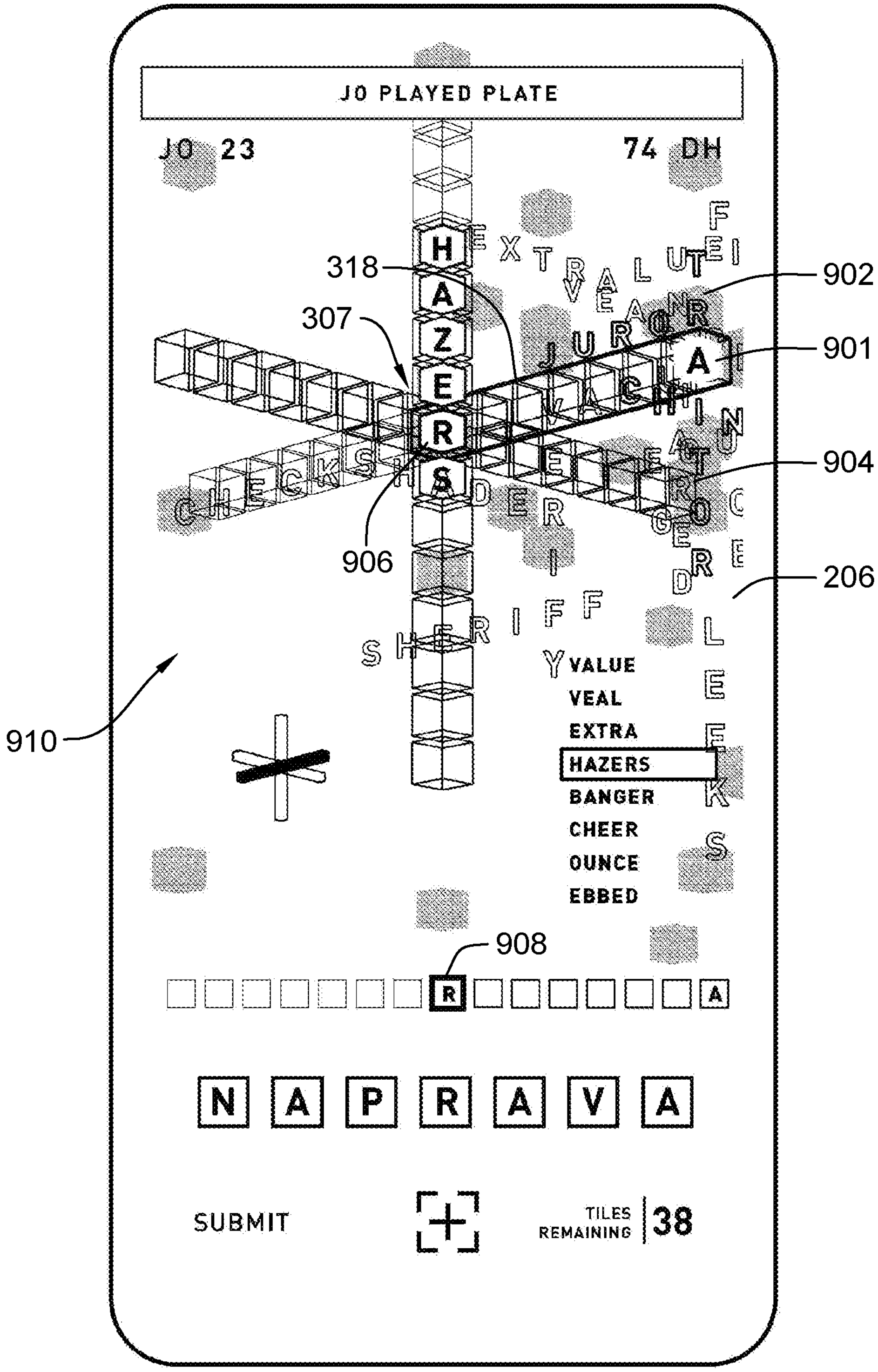
FIGS. 9A-9D illustrate selective display of adjacent words according to some present aspects.

In FIG. 9A, the processor 104 may display all possible value cubic elements for the selected word 318. In the example illustrated in FIG. 9A, the selected word 318 includes only one value cubic element 906. In an aspect, the word builder 310 may highlight the word builder tile 908 corresponding to the value cubic element 906.

Figure 9B:
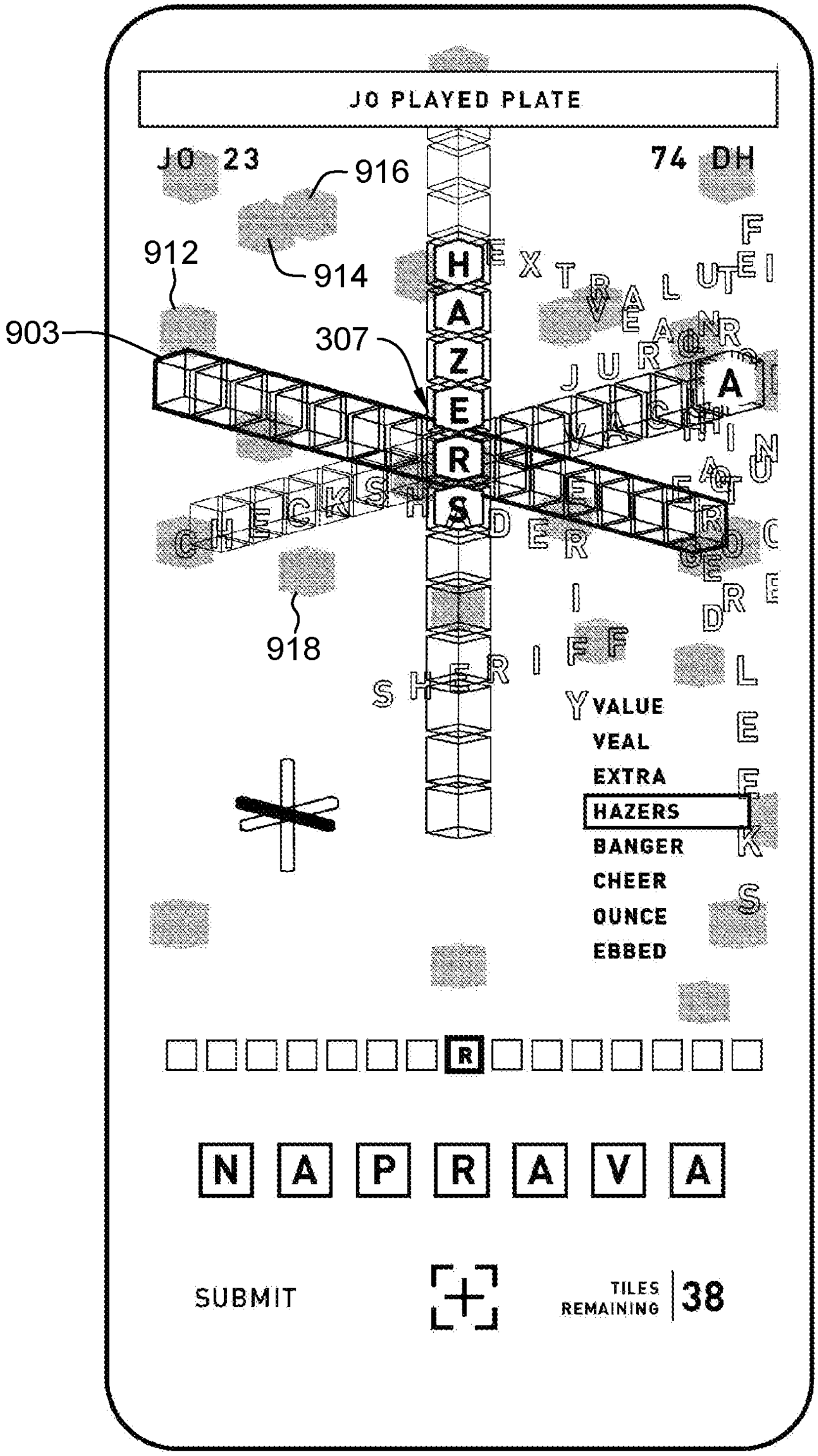

It should be noted that in FIG. 9A, no play objects are shown in quadrant 910, since none of them would be meaningful to the selected word 318. FIG. 9B illustrates that in response to user's selection of a second play axis 903, the processor 104 may display additional play objects that are meaningful to the second play axis 903. Such additional play objects may include, but are not limited to value cubic elements 912-918.

Figure 9C:
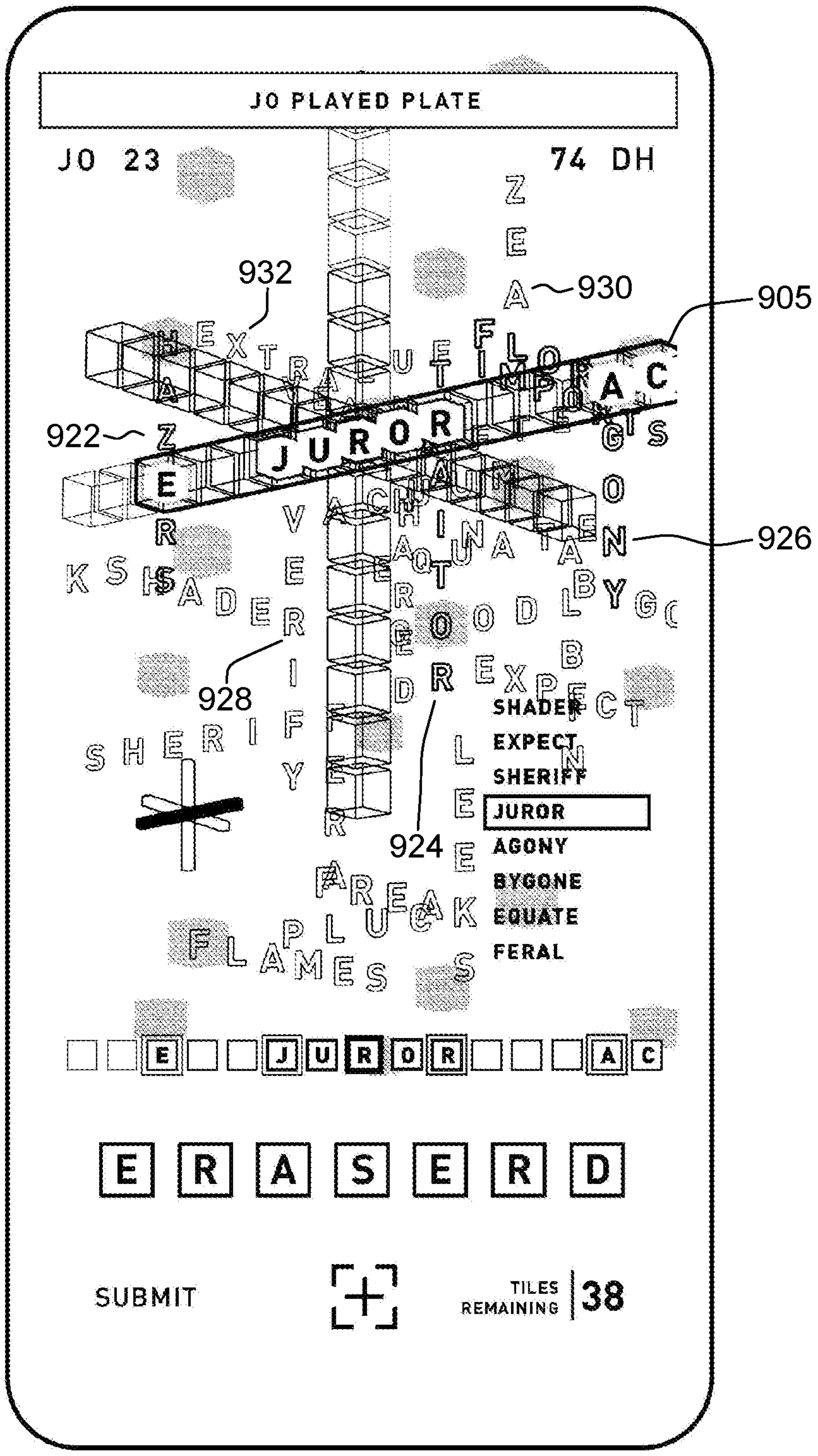

As shown in FIG. 9C, the processor 104 may brightly highlight letters of play objects intersecting the selected axis 905. In FIG. 9C, such play objects include play objects 922, 924 and 926 containing words "HAZERS", "TRAITOR" and "AGONY," respectively. In an aspect, words and letters of play objects that are adjacent to the selected play axis may be moderately highlighted. Advantageously, such visual presentation may indicate to a user play objects that should be considered for play in the selected play axis. In FIG. 9C such moderately highlighted play objects include, but are not limited to, play objects 928, 930, and 932.

Figure 9D:
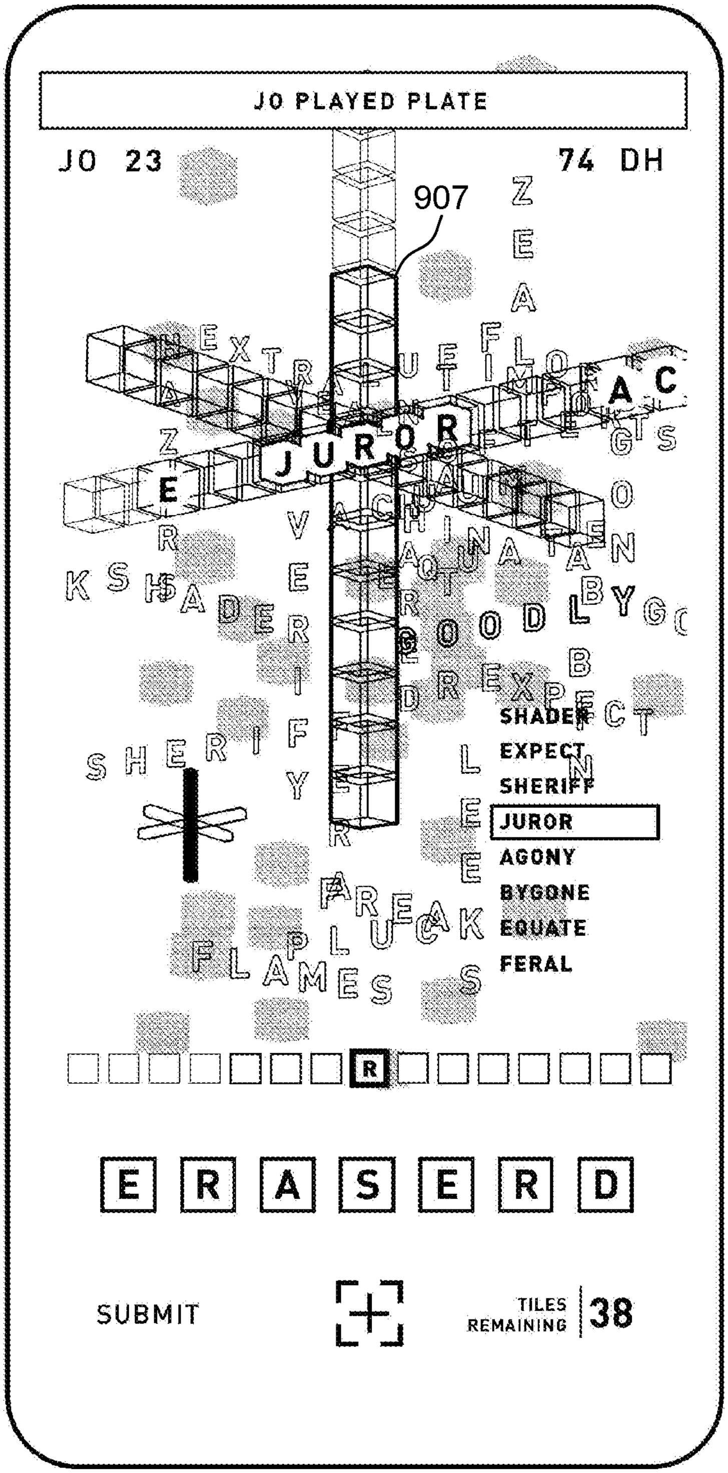

It should be noted that once the user places letters in the selected play axis to form new play objects (words), in response, the processor 104 may moderately highlight corresponding adjacent play objects. FIG. 9D illustrates that when a user selects a different play axis 907, the aforementioned play objects may be highlighted differently in response. In other words, the described dynamic real-time highlighting scheme of various play objects helps users visualize different play objects within the display cube 206 that should be considered for a particular play.

Figure 10A:
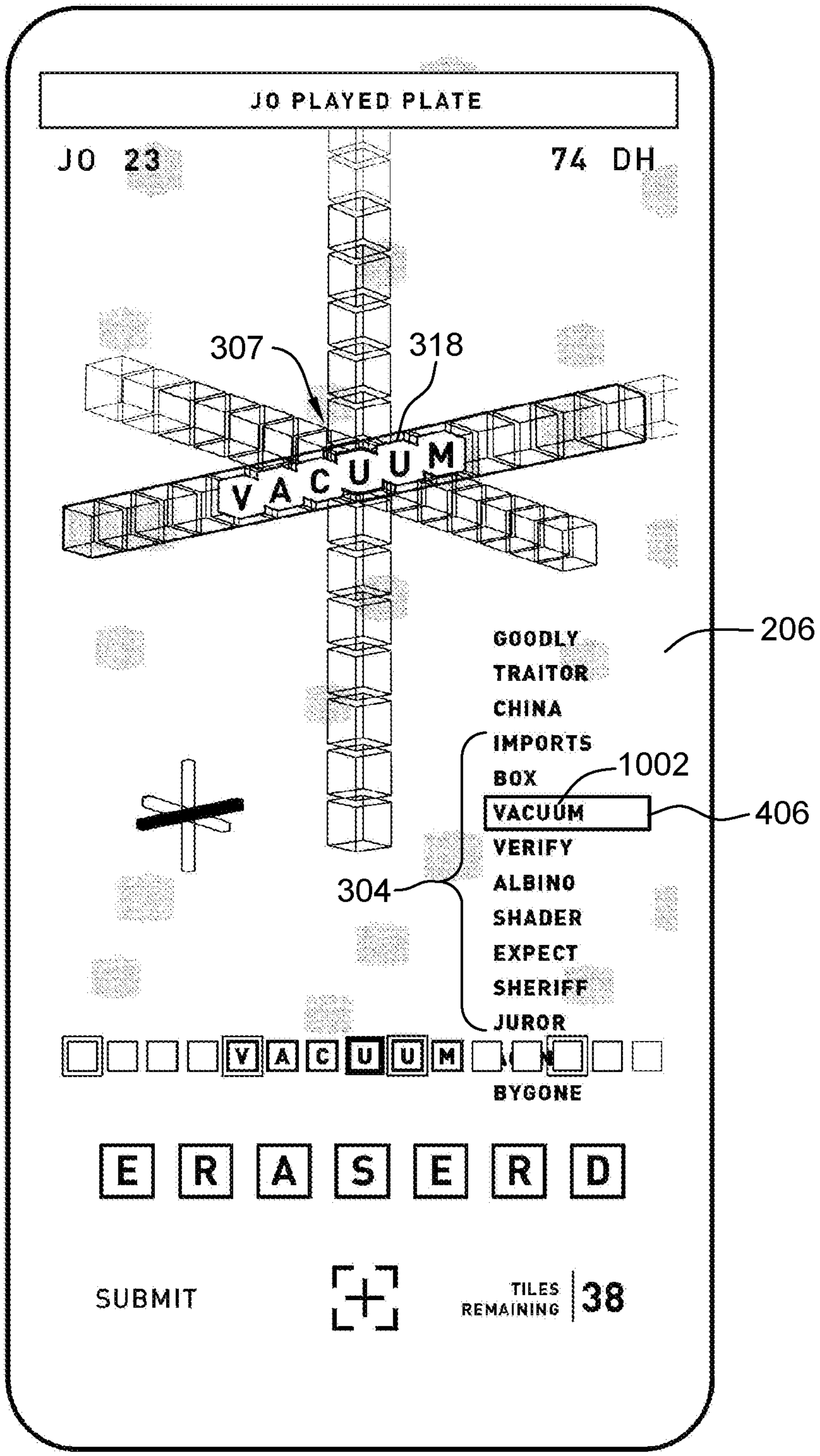
FIGS. 10A-10C illustrate the process of selecting a different word in a display cube according to some present aspects.
Figure 10B:
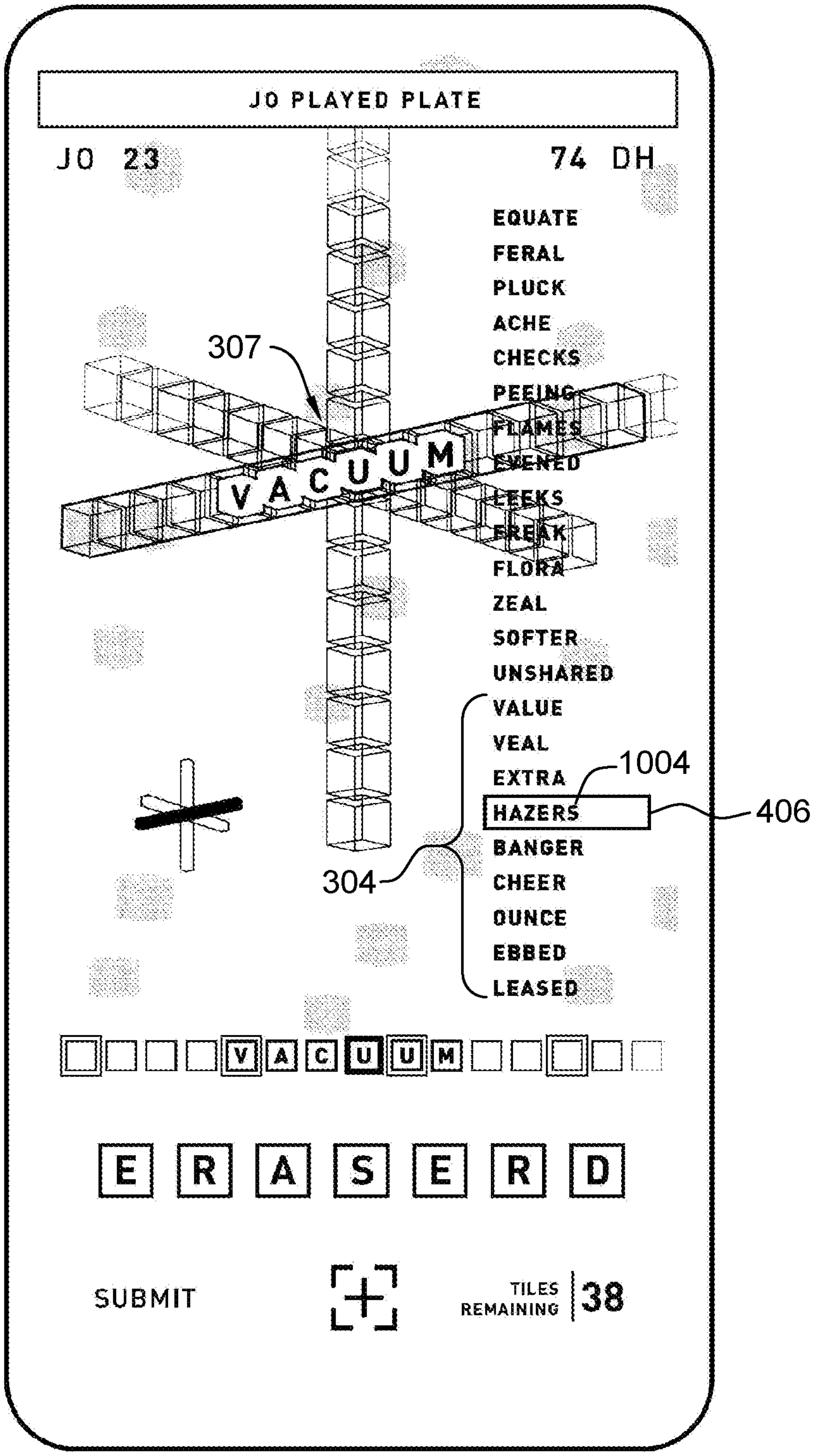
Figure 10C:
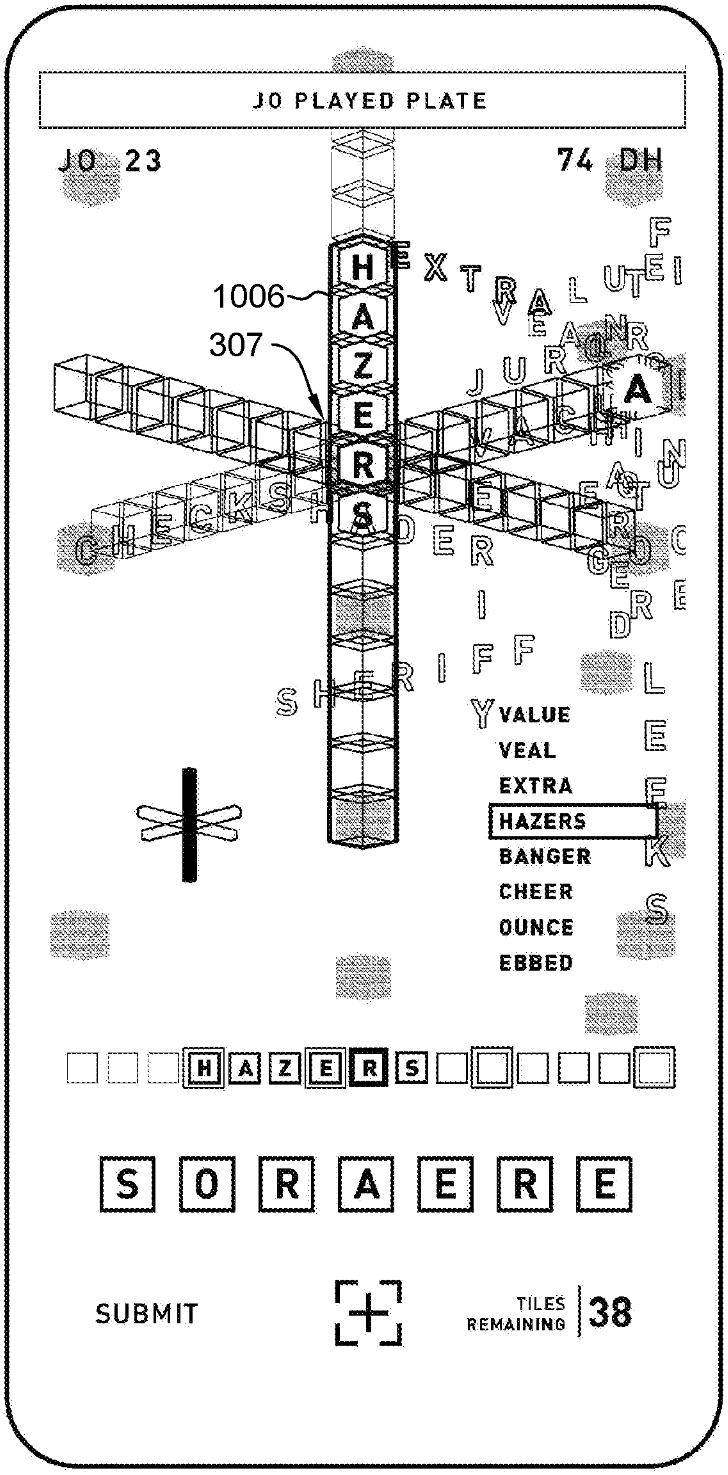

FIGS. 10A-10C illustrate the process of selecting a different word in a display cube according to some present aspects. In an aspect, to navigate the display cube 206 towards a different word, a user may tap the highlight rectangle 406 and move it (i.e., the list) up or down along the word list 304 of the display cube 206. In an aspect, the word list 304 may be rendered along the y-axis of the crosshair object 307. It should be noted that the selected word 318 in the crosshair object 307 corresponds to the word selected by the highlight rectangle 406. In an aspect, in response to detecting a user touch of the highlight rectangle 406, the processor 104 may dim the background and may disable user's gesture-based and touch-based interaction with the display cube 206. Furthermore the words a game cube may light up as the list words move into the selector rectangle.

As noted above, a user may move the highlight rectangle 406 up or down to locate the next word to view. For example, a user may use the highlight rectangle 406 to move from the selected word 1002 containing the word "VACCUM" shown in FIG. 10A to the word "HAZERS" 1004, as shown in FIG. 10B. In response to a user releasing the highlight rectangle 406 at the word "HAZERS" 1004 in the word list 304, the processor 104 may render the game object 1006 containing the word "HAZERS," as shown in FIG. 10C.

Figure 11A:
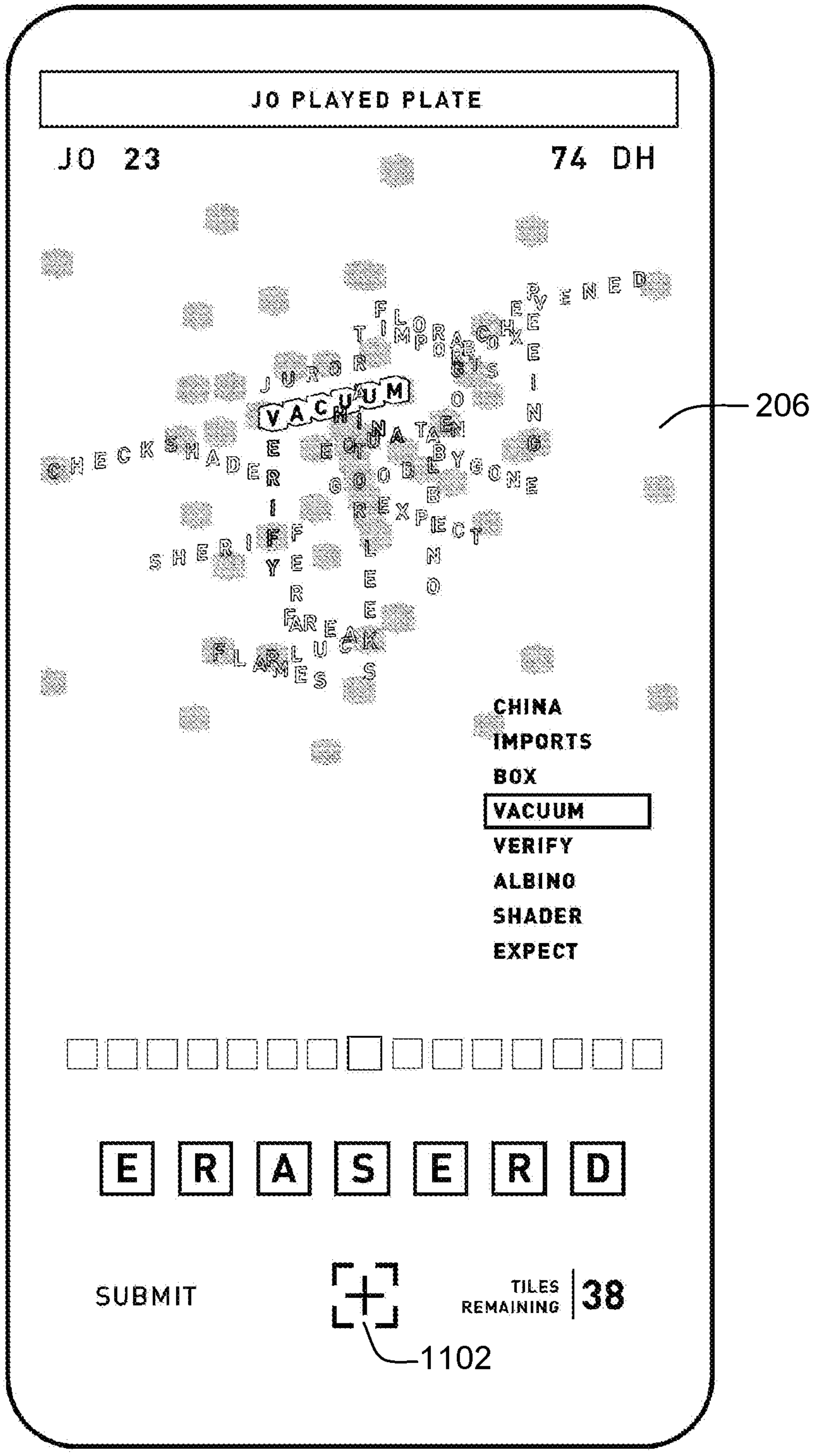
FIGS. 11A-11B illustrate a user interface for accessing different game play options and functions according to some present aspects.
Figure 11B:
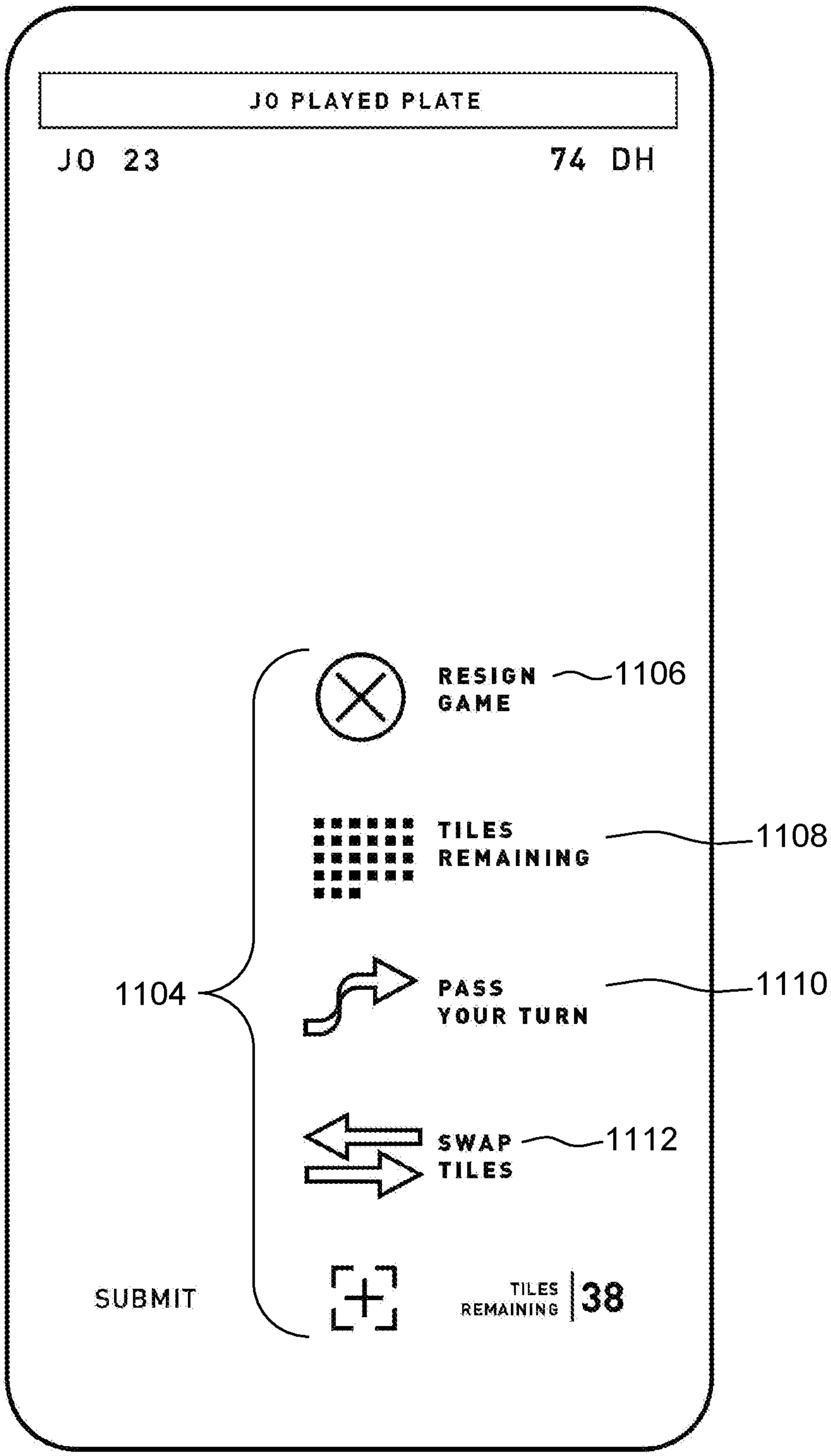

FIGS. 11A-11B illustrate a user interface for accessing different game play options and functions according to some present aspects. In an aspect, various game play options and functions may be accessed by a user by utilizing a menu access button 1102 that may be rendered in the middle of the bottom portion of the screen. In response to user tapping the menu access button 1102, the processor 104 may dim the background portion of the screen that may include the display cube 206. In addition, the processor 104 may present an interactive menu 1104 of the available play options, as shown in FIG. 11B.

In an aspect, the interactive menu 1104 may include, but is not limited to the following buttons: "Resign game" 1106, "Tiles remaining" 1108, "Pass your turn" 1110, and "Swap tiles" 1112.

In response to user pressing the "Resign game" button 1106, the processor 104 may enable the user to quit the game and may close the game software application. In response to user pressing the "Pass your turn" button 1110, the processor 104 may enable the user to pass their turn and may enable the next player to make a play.

In an aspect, in response to user pressing the "Swap tiles" button 1112, the processor 104 may render an interactive UI control element that may enable the user to indicate specific letters from the plurality of input tiles 312 that the user may want to exchange for new letters. The aforementioned interactive UI control element may be further configured to perform the exchange of corresponding letters.

In an aspect, in response to user pressing the "Tiles Remaining" button 1108, the processor 104 may render another UI control element that may include, for example, a grid of all letters of the alphabet (and may also include a blank "wild card" space). The processor 104 may provide information, such as the number of tiles remaining, for each of the plurality of letters of the alphabet.

In an optional aspect, the interactive menu 1104 may include a UI control element configured to display various game related statistics, such as, but not limited to community ranking (e.g., top X %), highest score, average score, wins between individual players, best single play, number of "bingo's."

Figure 12:
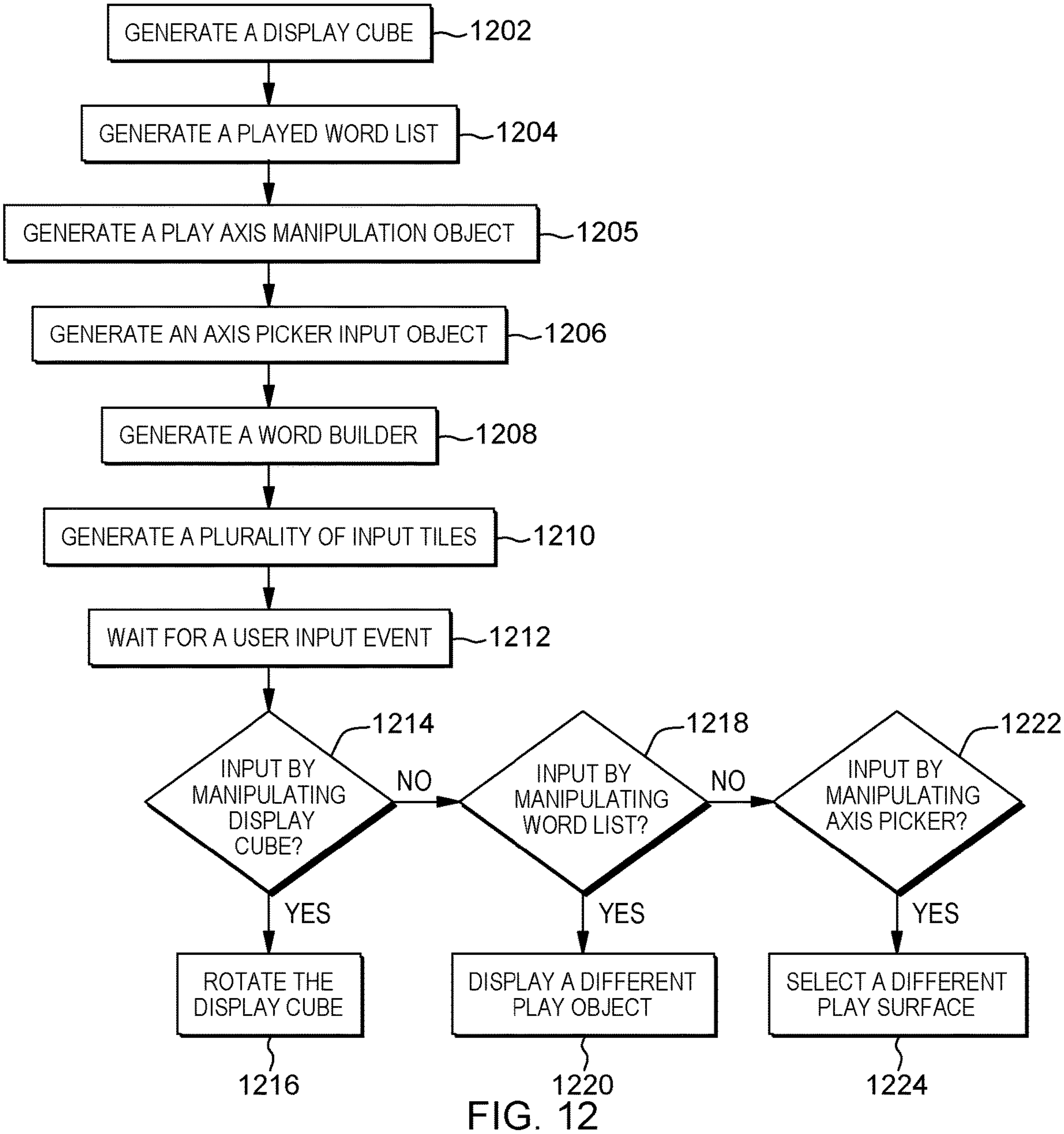
FIG. 12 is a flowchart of an example method for generating an interactive 3D Scrabble® game, in accordance with aspects of the present disclosure.

FIG. 12 is a flowchart of an example method for generating an interactive three dimensional (3D) Scrabble® game, in accordance with aspects of the present disclosure. FIGS. 1-11B may be referenced in combination with the flowchart of FIG. 1.

At 1202, the processor 104 may generate a display cube 206. In an aspect, the display cube 206 permits the game to be played and manipulated in three dimensions by allowing the player to manipulate the display cube to expose the respective faces during play of the Scrabble® game. The virtual 3D display cube 206 includes a plurality of mutually perpendicular surfaces. Each of the plurality of surfaces has a unique play surface associated with the 3D game and may include various combinations play objects (words) of the Scrabble®. By rotating the view of the display cube 206, a user may get a better sense of a three dimensional position of each word within the display cube 206.

At 1204, the processor 104 may generate a played word list. In an aspect, by default, the processor 104 may render the played words in the word list 304 for the side of display cube 206 facing the user. As shown in FIG. 4A, a user may move the word list 304 to another word position by touching 304 the highlight rectangle 406 and moving it up 308 or down along the y-axis of the display cube 206. It should be noted that the selected word 318 in the display cube 206 corresponds to the word selected by the highlight rectangle 406.

At 1205, the processor 104 may generate a crosshair object 307.

At 1206, the processor 104 may generate an axis picker input object 308. Advantageously, the axis picker input object 308 is a visualization tool that enables users to see three mutually perpendicular axes that are available for a new game play. User actions include visualization command inputs or graphical gestures directed at the axis picker input object 308 where the processor 104 may analyze such actions. For example, if the display cube 206 is generated using X, Y, Z coordinate axes, the axis picker input object 308 may be used to select one of X, Y and Z directions for next game play. A user may dynamically switch between different play axes by tapping one of the axes 502, 504 and 506 on the axis picker input object 308, as shown in FIGS. 5A-5C.

At 1208, the processor 104 may generate a word builder 310. FIGS. 8A-8D illustrate manipulation of the word builder input object 310 according to some present aspects. More specifically, FIG. 8A illustrates how a user may place letters into the selected play axis 802 corresponding to the selected word 318. In an aspect, the word builder input object 310 may include a plurality of word builder tiles 804. Each word builder tile 804 may represent a particular letter in the selected play axis 802. In an aspect, the word builder 310 serves as a proxy of the selected play axis 802 of the display cube 206. More specifically, the word builder 310 may display value cubic elements (if any) that are in play and located in the selected play axis 802, as well as new and previously played letters in the selected play axis 802.

At 1210, the processor 104 may generate a plurality of input tiles 312. In an aspect, at the start of the game, the processor 104 may assign 7 randomly generated letters to the input tiles 312 for each player participating in the game.

At 1212, the processor 104 may wait for a user input event. In an aspect, a user may provide input by manipulating at least one of the virtual 3D display cube 206, the word list 304, the axis picker input object 308, the word builder 310 or the plurality of input tiles 312.

If the user provided input by manipulating the display cube 206 (decision block 1214, "Yes" branch) then, at 1216, the processor 104 may rotate the display cube 206 along one of the three mutually perpendicular axes to display at least one of the plurality of play objects from different angles. In an aspect, a user may rotate the display cube 206 left/right around vertical axis at any time while playing. In an aspect, the processor 104 may utilize rotational limit positions on each side, so that rotation of the display cube 206 may be stopped to prevent the display cube 206 from rendering played words backwards and/or from rendering played words in a stacked up fashion. In an aspect, the rotational limit position may be set at 28 degrees left or right with respect to the starting position. In an aspect, the default and optimum viewing position may render the display cube 206 rotated to the user at a 45-degree angle in such a way that overlap of both front and back edges of the display cube 206 is visible to user. It should be noted, that in various implementations other rotational limits may be used to improve readability of the data rendered by the display cube 206. The display cube 206 in FIG. 3C illustrates an exemplary original wide context view of the display cube 206.

If the user provided input by manipulating the word list 304 (decision block 1218, "Yes" branch) then, at 1220, the processor 104 may display a different play object within the display cube 206 as the selected play object based on user's manipulation of the word list 304. FIG. 4B illustrates a new word selected by a user via the highlight rectangle 406. In an aspect, in response to the newly selected word in the word list 304, the processor 104 may dynamically change the selected word 318 in the display cube 206. In other words, the selected word 318 in the display cube 206 always corresponds to the selected word in the word list 304.

If the user provided input by manipulating the axis picker input object 308 (decision block 1222, "Yes" branch) then, at 1224, the processor 104 may select a different surface as the play surface for the selected play object based on user's manipulation of the axis picker input object 308. In response to user pressing and holding 602 the axis picker input object 308, the axis picker input object 308 may expand and a vertical row of dots 604 may appear extending in the opposite directions from the center of the axis picker input object 308. A user may dynamically switch between different play axes by tapping one of the axes 502, 504 and 506 on the axis picker input object 308, as shown in FIGS. 5A-5C.

The disclosed approach provides game software configured to generate a 3D playable and movable Scrabble® game rendered in a display cube and having an interactive interface adapted for touch screen devices. In an aspect, the display cube is easily rotatable and tiltable to provide best viewing 3D angle for a user. The disclosed approach provides rotational limits to prevent any information from being presented backwards and/or from being stacked up. Advantageously, the disclosed approach enables user to tilt the display cube up or down to obtain optimum viewing angle as well. As yet another advantage, the disclosed interactive user interface enables users to switch between different viewing modes.

In other words, one aspect a method of generating an interactive three dimensional (3D) game includes generating a manipulable volumetric virtual 3D display cube. The manipulable volumetric virtual 3D display cube includes a plurality of cubic elements. Different combinations of the plurality of cubic elements include a plurality of play objects. A first input object, second input object, third input object, fourth input object and fifth input object is generated. A determination is made whether the user provided the input by manipulating at least one of the manipulable volumetric virtual 3D display cube, first input object, second input object, third input object or fourth input object The manipulable volumetric virtual 3D display cube is rotated along at least a vertical axis, in response to determining that the user provided the input by manipulating the manipulable volumetric virtual 3D display cube. A different play object is displayed within the manipulable volumetric virtual 3D display cube as the selected play object based on user's manipulation of the first input object, in response to determining that the user provided the input by manipulating the first input object. A different axis is selected as the play axis for the selected play object within the fifth input object based on user's manipulation of the second input object, in response to determining that the user provided the input by manipulating the second input object.

In one or any combination of these aspects, the interactive 3D game comprises a 3D Scrabble® game. Each of the plurality of play positions comprises an input tile.

In one or any combination of these aspects, the first input object is configured to navigate a list of played words. The word selected by the user in the list of played words corresponds to the selected play object in the virtual 3D display cube.

In one or any combination of these aspects, the second input object and the fifth input object comprises three mutually perpendicular axis. The user selects the play surface associated with the play object within the fifth input object by selecting a corresponding axis in the second input object.

In one or any combination of these aspects, the method further includes, in response to determining that the user holds one of the three mutually perpendicular axis in the second input object with a finger and subsequently moves the finger upwards or downwards from a holding position, changing play positions within the selected play object based on the movement of user's finger.

In one or any combination of these aspects, the method further includes, in response to determining that the user holds one of the three mutually perpendicular axis in the second input object with two fingers and subsequently moves the two fingers upwards or downwards from a holding position, displaying within the virtual 3D display cube one or more alternative play objects. The one or more alternative play objects at least partially shares a common edge with the selected play object.

In one or any combination of these aspects, the third input object is configured to display one or more input tiles. Each of the one or more input tiles corresponds to a play position within the selected play object. One more letters populated within the input tiles of the third input object correspond to one or more letters populated within the play object.

In one or any combination of these aspects, the fourth input object is configured to display a predefined number of input tiles. Generating the fourth input object includes automatically populating each of the input tiles of the fourth input object with a random letter.

In one or any combination of these aspects, the method further includes: in response to determining that a user selected one of the input tiles of the fourth input object and in response to determining that the user dragged the selected input tile to a particular input tile of the third input object, updating the particular input tile of the third input object to display the letter populated within the selected input tile of the fourth input object, and updating a play position within the selected play object corresponding to the particular tile of the third input object to display the letter populated within the selected input tile of the fourth input object.

It should be noted that although the user interface featuring the volumetric virtual 3D display cube is shown as being output on a touchscreen-enabled computer device (e.g., a smartphone), the user interface may also be realized in an augmented reality (AR), virtual reality (VR), or mixed reality (MR) device. For example, the user may wear a VR/AR headset that displays the user interface such that it appears to the viewer to be an actual 3D object, existing in x y z space. In this scenario, users may still rotate the game cube left and right for optimum views, but because AR and VR headsets display objects in stereo 3D, their sense of "front" and "back" is clearer. Because there are no limitations of a mobile screen, there is more room to place the game and navigation objects. This includes a fuller view of the game cube and its navigation objects. In particular, the axis picker input object and the word list can be located outward and not overlap the game cube.

In some aspects, the sense of the third dimensional space allows the lower input objects (e.g., word builder object and tile rack) to appear to exist closer to the user than the rest of the game items, giving a sense of them being in the key input position for interacting with their letters and seeing them being placed in the game cube.

The user may additionally use a remote of the VR/AR headset (e.g., a controller, electronic gloves, etc.) or a camera (e.g., motion sensor) to press buttons, make gestures, etc., that are comparable to the tapping and swiping actions described throughout the present disclosure. For example, the user may make a swiping motion in the air. This movement may be captured by a camera and converted into a game command (e.g., swiping) that is executed and shown on the user headset in the VR headset. In one aspect, the inputs provided by the user may be tracked via finger movements on the hand of the user. For example, the user may wear a device on his/her wrist or a device may be integrated in the AR/VR headset that monitors the palm area of the user's hand. As the user makes gestures with his/her finger over the palm area (e.g., swiping, pinching, circle gesture, etc.), the device may utilize detection methods such as, but not limited to, radar/Bluetooth/Wi-Fi technology and/or computer vision techniques to detect the gestures and movements and translate them into game commands. For example, the user may guide his right hand index finger in a up/down motion on the left hand palm area, and the device may classify this motion as a vertical swipe in the game.

Figure 13:
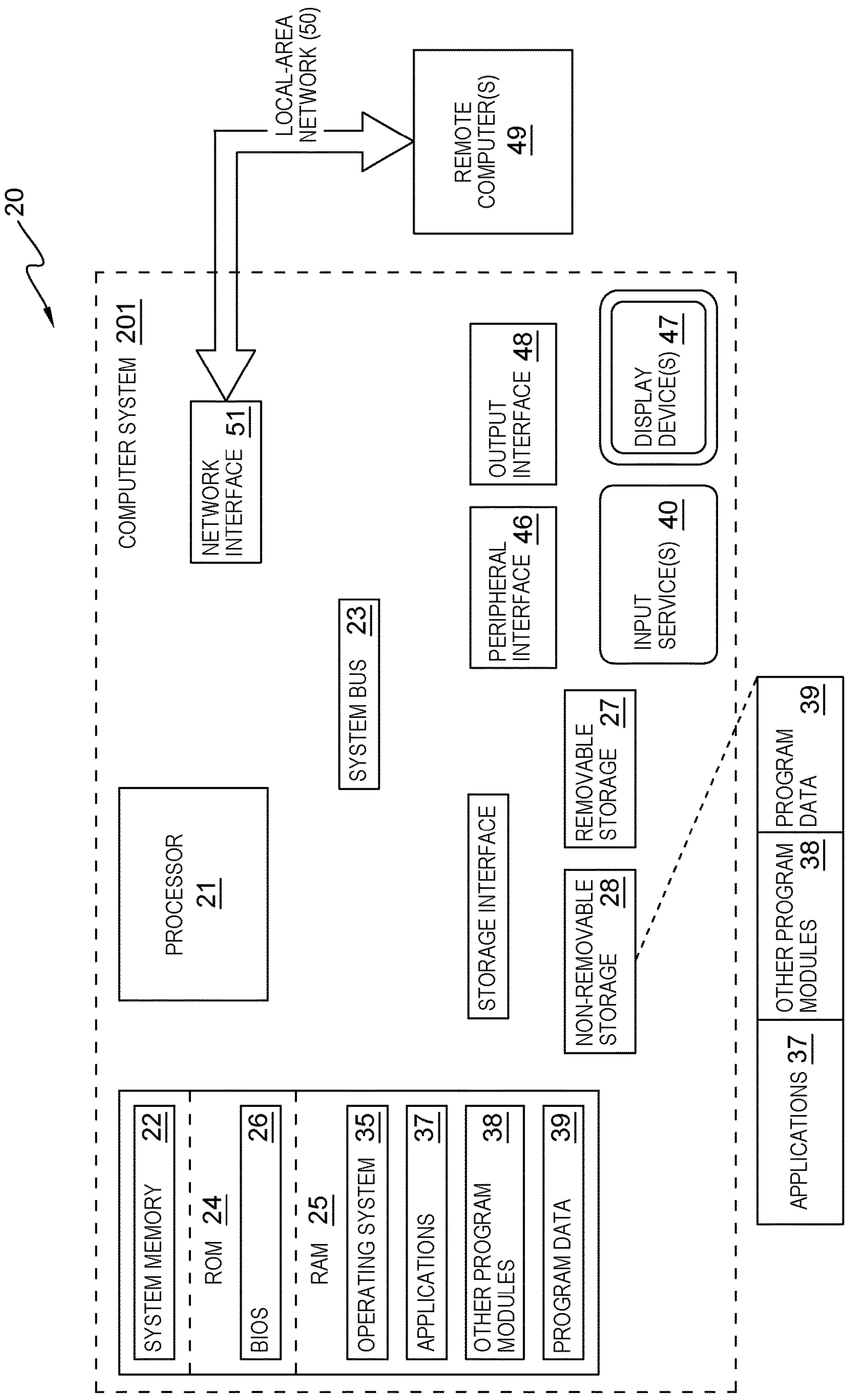
FIG. 13 is a block diagram of various hardware components and other features of an example computer hosting game software in accordance with aspects of the present disclosure

FIG. 13 shows an example of a computer system on which variant aspects of systems and methods disclosed herein may be implemented. The computer system 20 may represent the host computing device 106 shown in FIG. 1 and can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, HyperTransport™, InfiniBand™, Serial ATA, I2C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

What is claimed is:

1. A method for generating an interactive three dimensional (3D) game, comprising:

generating a manipulable volumetric virtual 3D display cube, the manipulable volumetric virtual 3D display cube including a plurality of play objects, wherein one of the plurality of play objects within the virtual 3D display cube is selected;

generating a first input object, a second input object, a third input object, a fourth input object and a fifth input object;

detecting an input from a user;

determining whether the user provided the input by manipulating at least one of the manipulable volumetric virtual 3D display cube, the first input object, the second input object, the third input object, or the fourth input object;

in response to determining that the user provided the input by manipulating the manipulable volumetric virtual 3D display cube, rotating the manipulable volumetric virtual 3D display cube along one of three mutually perpendicular axes to display at least one of the plurality of play objects from different angles;

in response to determining that the user provided the input by manipulating the first input object, displaying a different play object within the manipulable volumetric virtual 3D display cube as the selected play object based on user's manipulation of the first input object;

in response to determining that the user provided the input by manipulating the second input object, selecting a different surface as the play surface within the fifth input object for the selected play object based on user's manipulation of the second input object, wherein the second input object and the fifth input object comprise three mutually perpendicular axes and wherein a selection of the play surface associated with the play object within the fifth input object corresponds to a user selection of a corresponding axis in the second input object; and in response to determining that the user holds one of the three mutually perpendicular axes in the second input object with a finger and subsequently moves the finger upwards or downwards from a holding position, changing play positions within the selected play object based on a movement of the finger of the user.

2. The method of claim 1, wherein the interactive 3D game comprises a 3D SCRABBLE game and wherein each of a plurality of play positions of each plurality of play objects comprises a tile of the 3D SCRABBLE game.

3. The method of claim 2, wherein the first input object is configured to navigate a list of played words, and wherein the word selected by the user in the list of played words corresponds to the selected play object in the manipulable volumetric virtual 3D display cube.

4. The method of claim 1, further comprising: in response to determining that the user holds one of the three mutually perpendicular axes in the second input object with two fingers and subsequently moves the two fingers upwards or downwards from a holding position, displaying within the manipulable volumetric virtual 3D display cube one or more alternative play objects, wherein the one or more alternative play objects at least partially shares a common edge with the selected play object.

5. The method of claim 2, wherein the third input object is configured to display one or more word builder tiles, wherein each of the one or more word builder tiles corresponds to a play position within the selected play object and wherein one or more letters populated within the word builder tiles of the third input object correspond to one or more letters populated within the play object.

6. The method of claim 2, wherein the fourth input object is configured to display a predefined number of input tiles and wherein generating the fourth input object comprises automatically populating each of the input tiles of the fourth input object with a random letter.

7. The method of claim 6, further comprising: in response to determining that a user selected one of the input tiles of the fourth input object and in response to determining that the user dragged the selected input tile to a particular word builder tile of the third input object, updating the particular word builder tile of the third input object to display the letter populated within the selected input tile of the fourth input object, and updating a play position within the selected play object corresponding to the particular tile of the third input object to display the letter populated within the selected input tile of the fourth input object.

8. A system for generating an interactive three dimensional (3D) game comprising:

a memory and a hardware processor configured to:

generate a manipulable volumetric virtual 3D display cube, the manipulable volumetric virtual 3D display cube including a plurality of play objects, wherein one of the plurality of play objects within the virtual 3D display cube is selected;

generate a first input object, a second input object, a third input object, a fourth input object and a fifth input object;

detect an input from a user;

determine whether the user provided the input by manipulating at least one of the manipulable volumetric virtual 3D display cube, the first input object, the second input object, the third input object or the fourth input object;

in response to determining that the user provided the input by manipulating the manipulable volumetric virtual 3D display cube, rotate the manipulable volumetric virtual 3D display cube along one of three mutually perpendicular axes to display at least one of the plurality of play objects from different angles;

in response to determining that the user provided the input by manipulating the first input object, display a different play object within the manipulable volumetric virtual 3D display cube as the selected play object based on user's manipulation of the first input object;

in response to determining that the user provided the input by manipulating the second input object, select a different surface as the play surface within the fifth input object for the selected play object based on user's manipulation of the second input object, wherein the second input object and the fifth input object comprise three mutually perpendicular axes and wherein a selection of the play surface associated with the play object within the fifth input object corresponds to a user selection of a corresponding axis in the second input object; and in response to determining that the user holds one of the three mutually perpendicular axes in the second input object with a finger and subsequently moves the finger upwards or downwards from a holding position, change play positions within the selected play object based on a movement of the finger of the user.

9. The system of claim 8, wherein the interactive 3D game comprises a 3D SCRABBLE game and wherein each of a plurality of play positions of each plurality of play objects comprises a tile of the 3D SCRABBLE game.

10. The system of claim 9, wherein the first input object is configured to navigate a list of played words, and wherein the word selected by the user in the list of played words corresponds to the selected play object in the manipulable volumetric virtual 3D display cube.

11. The system of claim 8, wherein the hardware processor is further configured to: in response to determining that the user holds one of the three mutually perpendicular axes in the second input object with two fingers and subsequently moves the two fingers upwards or downwards from a holding position, display within the manipulable volumetric virtual 3D display cube one or more alternative play objects, wherein the one or more alternative play objects at least partially shares a common edge with the selected play object.

12. The system of claim 9, wherein the third input object is configured to display one or more word builder tiles, wherein each of the one or more word builder tiles corresponds to a play position within the selected play object and wherein one or more letters populated within the word builder tiles of the third input object correspond to one or more letters populated within the play object.

13. The system of claim 9, wherein the fourth input object is configured to display a predefined number of input tiles and wherein generating the fourth input object comprises automatically populating each of the input tiles of the fourth input object with a random letter.

14. The system of claim 13, wherein the hardware processor is further configured to: in response to determining that a user selected one of the input tiles of the fourth input object and in response to determining that the user dragged the selected input tile to a particular word builder tile of the third input object, update the particular word builder tile of the third input object to display the letter populated within the selected input tile of the fourth input object, and update a play position within the selected play object corresponding to the particular tile of the third input object to display the letter populated within the selected input tile of the fourth input object.

15. A non-transitory computer readable medium storing thereon computer executable instructions generating an interactive three dimensional (3D) game, including instructions for:

generating a manipulable volumetric virtual 3D display cube, the manipulable volumetric virtual 3D display cube including a plurality of play objects, wherein one of the plurality of play objects within the virtual 3D display cube is selected;

generating a first input object, a second input object, a third input object, a fourth input object and a fifth input object;

detecting an input from a user, determining whether the user provided the input by manipulating at least one of the manipulable volumetric virtual 3D display cube, the first input object, the second input object, the third input object or the fourth input object;

in response to determining that the user provided the input by manipulating the manipulable volumetric virtual 3D display cube, rotating the manipulable volumetric virtual 3D display cube along one of three mutually perpendicular axes to display at least one of the plurality of play objects from different angles;

in response to determining that the user provided the input by manipulating the first input object, displaying a different play object within the manipulable volumetric virtual 3D display cube as the selected play object based on user's manipulation of the first input object;

in response to determining that the user provided the input by manipulating the second input object, selecting a different surface as the play surface within the fifth input object for the selected play object based on user's manipulation of the second input object, wherein the second input object and the fifth input object comprise three mutually perpendicular axes and wherein a selection of the play surface associated with the play object within the fifth input object corresponds to a user selection of a corresponding axis in the second input object; and in response to determining that the user holds one of the three mutually perpendicular axes in the second input object with a finger and subsequently moves the finger upwards or downwards from a holding position, changing play positions within the selected play object based on a movement of the finger of the user.

16. The medium of claim 15, wherein the interactive 3D game comprises a 3D SCRABBLE game and wherein each of a plurality of play positions of each plurality of play objects comprises a tile of the 3D SCRABBLE game.

* * * * *